United States Patent [19]
Douik et al.

[11] Patent Number: 6,012,152
[45] Date of Patent: Jan. 4, 2000

[54] SOFTWARE FAULT MANAGEMENT SYSTEM

[75] Inventors: Samir Douik, Sainte Anne de Bellevue; Raouf Boutaba, Montreal, both of Canada

[73] Assignee: Telefonaktiebolaget LM Ericsson (publ), Stockholm, Sweden

[21] Appl. No.: 08/918,100

[22] Filed: Aug. 21, 1997

Related U.S. Application Data

[60] Provisional application No. 60/031,947, Nov. 27, 1996.

[51] Int. Cl.[7] .................................................. G06F 11/00
[52] U.S. Cl. .............................................................. 714/26
[58] Field of Search ................................ 714/26, 37, 31; 379/21; 395/10, 12, 22, 50

[56] References Cited

U.S. PATENT DOCUMENTS

| | | | |
|---|---|---|---|
| 5,159,685 | 10/1992 | Kung ........................................ | 395/575 |
| 5,297,193 | 3/1994 | Bouix et al. .............................. | 379/63 |
| 5,408,218 | 4/1995 | Svedberg et al. ........................ | 340/507 |
| 5,521,958 | 5/1996 | Selig et al. ................................ | 379/21 |
| 5,664,093 | 9/1997 | Barnett et al. ............................ | 714/31 |
| 5,764,726 | 6/1998 | Selig et al. ................................ | 379/21 |

OTHER PUBLICATIONS

Mercedes Garijo, Andres Cancer and Julio J. Sanchez; "A Multiagent System for Cooperative Network–Fault Management"; PAAM '96; Apr. 24, 1996; p. 279–294.

Toru Kobayashi, Keitaro Horikawa, and Fumiaki Ushida; "An Information Model for Software Operation Systems"; Proceedings of the International Conference on Communications (ICC), Geneva; May 23–26, 1993, vol. 2; pp. 1205–1209.

Takahiro Miyazaki, Hiroshi Fujimoto, Moo Wan Kim, and Massaaki Wakamoto; "Improving Operation and Maintenance for Switching Network"; Communications Technology for the 1990's and Beyond Dallas; Nov. 27–30, 1989, vol. 2 NR; pp. 1149–1153.

Primary Examiner—Robert W. Beausoliel, Jr.
Assistant Examiner—Pierre Eddy Elisca
Attorney, Agent, or Firm—Smith & Danamraj, P.C.

[57] ABSTRACT

A Software Fault Management (SFM) system for managing software faults in a managed mobile telecommunications network. The SFM system includes an Intelligent Management Information Base (I-MIB) comprising a Management Information Base (MIB) and a Knowledge Base (KB) having a functional model of the managed network and a trouble report/known faults (TR/KF) case base. The SFM system also includes an intelligent multi-agent portion having a plurality of agents which process the software faults utilizing the functional model from the I-MIB, case-based information, and other management information. The I-MIB and the intelligent multi-agent portion are compliant with Telecomunications Management Network (TMN) principles and framework. Fault management is both proactive and reactive. The SFM system is made independent of technology-specific implementations by representing the underlying switch design knowledge in a modular and changeable form which is then interpreted by the intelligent multi-agent portion. A clear separation is maintained between the generic procedural inference mechanisms and agents, and the specific and explicit models of the different network elements of a mobile telecommunications network.

26 Claims, 6 Drawing Sheets

SOFTWARE FAULT MANAGEMENT SYSTEM

CROSS-REFERENCES TO RELATED APPLICATIONS

This application is related to provisional application Ser. No. 60/031,947 entitled, Fault Management System, filed Nov. 27, 1996.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Technical Field of the Invention

This invention relates to software fault management, and, more particularly, to an intelligent multi-agent system for software fault management in a radio telecommunications network.

2. Description of Related Art

Expert systems are computer programs employing programming techniques found in the field of Artificial Intelligence known as knowledge-based systems. These computer programs are designed to apply formal representations of domain knowledge or expertise to solve problems. Symbolic descriptions (e.g., in the form of rules, frames, predicate logic, etc.) of this expertise characterize the definitional and empirical relationships in a domain and the procedures for manipulating these descriptions. This approach to computational models has proven extremely useful in automating complex tasks normally accomplished by human experts.

Compared to conventional programming methods, the emphasis in developing expert systems is placed on processing information at the knowledge-level rather than at the data-level. Knowledge is distinguished from data because of its inferential capacity which allows an information processing agent—the inference engine—to navigate from one set of data to another, for example: from a set of observations to the identification of problem symptoms; from a set of symptoms to a diagnosis; or from a set of diagnostics to a recovery plan of action. In each of these examples, numerous and intricate reasoning steps or inference procedures may be required to arrive at final conclusions. These procedures are generated dynamically as the inference engine of a knowledge-based system matches the current inputs to relevant elements in the knowledge base. This feature provides the means to re-assess the state of a situation during each cycle of a reasoning mechanism. As a result, a system can react to a dynamic situation more readily than conventional programs.

Today's cellular telecommunications networks are becoming increasingly complex in nature with many interworking nodes. Suppliers of telecommunications switching equipment may have several significantly different types of systems based on a variety of technologies, with several versions of each spread over hundreds of interworking nodes throughout the world. In addition, the need to constantly add new features leads to a rapid increase in system size and complexity. Adding even more complexity is the need to develop new trouble shooting tools. Taking this into account, and the fact that the maintenance of existing products is rapidly growing in volume and cost, it is imperative to drastically reduce the number of trouble reports and to improve response time.

The real-time nature of today's mobile telecommunication networks adds to the difficulty of the fault management task. For example, a diagnostic system must be able to handle alarm notifications flow as quickly as the average speed at which they are generated. The maintenance of an accurate model of the mobile network configuration is critical for the fault management task. A good knowledge of the faults to be processed, as well as their dynamic features, are also of importance. For example, the severity of a fault can depend on the current state of the traffic load or a particular time or day of the week, and the fault's assigned priority depends on its severity. Filtering and correlation are two major aspects to be considered to make easier the separation of the principal fault from its side effects. Indeed, the physical and "air" interconnections of network components and the logical dependencies between the distributed software modules lead to multiple manifestations of the same fault. Efficient tests must be performed automatically and their results consistently interpreted to help the diagnosis and decision making processes.

Finally, current telecommunication systems contain a high amount of software modules which can be one of the sources of the faults occurring within the network. Testing of such large software systems is an example of a resource and time consuming activity. Applying equal testing and verification efforts to all parts of a software system is obviously cost prohibitive and a source of operational delay. Therefore, one needs to be able to identify fault-prone modules so that testing/verification efforts can be concentrated on these classes. This will optimize the reliability of a software system with minimum cost and, above all, optimize the fault identification process. Quantitative models can be used to predict which components are likely to contain the highest concentration of faults based on adequate software metrics, and the log of faults found by testers and clients of a software system. To develop such systems, a complete understanding of network management principles is required.

Network management means deploying and coordinating resources in order to plan, operate, administer, analyze, evaluate, design and expand communication networks to meet service level objectives at all times, at reasonable cost and with optimum capacity. Network management developments for mobile networks have almost the same objectives as for wired networks, the main objectives being to ensure good operation and service provisioning. Several standards have been developed for the management of networked systems in the scope of ISO/OSI network management activities. For telecommunication networks, the ITU (International Telecommunication Union) provides a guideline for the definition of the Telecommunication Management Network (TMN). A de-facto standard for the management of TCP/IP networks is the SNMP management protocol which is very widely used. In conformance with these standards or in a proprietary way, several developments have been achieved by both the industry and the research community in the area of wired network management. However, very few works are addressing the management of mobile networks. The actual challenge in this subject domain is the provision of an intelligent and automated management support system to improve availability, quality, and commercial success. This is needed for both wireless and wireline networks. The following sections review generic network management, the network management functionality specific to mobile networks which results from the wireless nature of these networks, and recent developments in automated fault management systems.

Generic Network Management

Five standard management functions are defined by ISO/OSI management: configuration, fault, security, accounting, and performance management. In the context of mobile networks, these functions apply together with some additional functions that are more specific to the wireless nature of these networks.

One of the most important requirements to be addressed by general purpose fault management systems is the ability to quickly identify the root cause of faults in the network and fix them. This is valid for mobile radio networks where an efficient fault management system should reduce the outage time on radio and other communication and commuting resources. This can be achieved by means of an automated analysis of the alarms generated by different components of the mobile system, and by an automated diagnosis process enabling the fault management system to quickly detect, locate and correct the source fault. The overall process involves filtering and correlation of alarms, and performing diagnostic tests and performance measures.

Basically, fault management deals with the identification of faults and their side effects in the network, their isolation, correction, and the restoration of the network to a desired state. The ultimate aim is to increase the network reliability and availability. Such a system must have enough capabilities to rapidly identify the cause of a fault, isolate the source of the fault, repair the faulty component and restore the network to its normal operational state. More globally, fault management is a collection of activities that are necessary to maintain a desired level of network services. In order to satisfy this requirement, these activities must, as completely as possible, guarantee the detection of all problems in the network and recognize the degradation of performance.

Fault management can be divided into four phases: monitoring, alarm analysis, fault localization, and fault recovery. Monitoring is needed for all management activities, including performance management, configuration management, and fault management. It is an essential means for obtaining the information required about network and system components. During monitoring, the behavior of the system is observed (event detection) and monitoring information is gathered and disseminated (notifications). Monitoring information is processed and utilized to make management decisions and to perform the appropriate control actions on the system.

In the scope of fault management, monitoring information comprises alarms generated by the managed resources and/or sent by the monitoring agent to notify the occurrence of faults. The processing of these alarms consists of discarding superfluous and non-relevant event notifications. Alarm analysis can be divided into two main activities that are filtering and correlation. Alarm filtering discards lower priority alarms or stores them in a log file. Alarm correlation recognizes commonalities between alarms and discards non-significant ones and side effects.

Fault diagnosis (and localization) consists of performing appropriate test sequences in order to locate the fault origin by reducing the number of suspicious components to a limited set containing, optimally, a single faulty component. Fault recovery consists of restoring the system to its normal operation either by isolating the faulty component or by repairing it. Alarm analysis and fault diagnosis are particularly important activities.

Alarm correlation consists of detecting commonalties between alarms, determining the principal alarms, and discarding their side effects (e.g., redundant alarms). This can vary from simple message filtering and redundant alarm suppression to more sophisticated alarm compression and generalization/specialization. The correlation process also reduces the number of suspicious components. The fault localization process can then be based on the remaining non-redundant alarms. The correlation process is iteratively executed by updating a list of potential faults and a list of suspicious components according to the newly received alarms and received information about the components states. A component is declared potentially faulty (highly suspicious) when a fault pattern involving this component is recognized.

Based on results of the alarm correlation process, a fault diagnosis is made. If the faulty component is not accurately identified, appropriate test sequences are repeatedly selected and performed on the remaining highly suspicious components. Test results are analyzed so as to locate the exact set of faulty components. Then, the operational attributes of the faulty components are set to appropriate values (e.g., "Abnormal", 0.0,0%, etc.). In the case of progressive degradation, these attributes are incrementally updated (e.g., "Warning", 0.35, 35%, etc.). When many levels of the overall hierarchy are concerned with the detected fault, the diagnosis process may involve all these levels.

A top down approach is usually used to refine the diagnosis within a given domain by delegating the fault localization responsibility to lower level domains which are more likely to contain the faulty component. This downward delegation can be applied recursively through many levels of the aggregation hierarchy with less suspicious components at each level and by executing more specialized test sequences. Each domain reports to its superiors the results of its diagnosis. The top down approach is often suitable when the fault is detected at the level of a given domain. A bottom up approach is used to notify concerned higher level domains and possibly the diagnosis result corresponding to this fault. This can be useful to prevent fault propagation and to set up the isolation/repair procedures. In addition, a peer-to-peer cooperation between managers of the same hierarchical level may be necessary to provide a consistent diagnosis. This is more likely the case when the potential faulty component is managed within two or more domains.

The configuration management function mainly handles initial setting of system data, their management (e.g., data update, inventory, etc.) and system configuration (e.g., the system topology). The ultimate aim is to provide consistent system data for each network element in order to guarantee a high network quality and thus customer satisfaction. More precisely, configuration management involves the availability of configuration maintenance data, version control, examination of relevant system data in network elements, analysis of regularly occurring problems, and cooperation with fault management processes.

For these configuration management activities, a uniform data base and/or unique interfaces for the exchange of data is necessary. The use of such common data base, often called the technical operational network system data base, optimizes data access procedures and simplifies the exchange of relevant and consistent data between the various involved departments (network planning, system design, services operation, etc.).

Software management includes a wide range of tasks and can be viewed, to a certain extent, as part of configuration management. Software management includes the management of existing software versions in operation, the installation of new hardware with the latest software versions, and controlling software improvements. Finally, the resolution of software problems is a major task in the software management process which includes the problem analysis over a certain period of time and over regional borders while maintaining the consistency of the technical operational database.

Mobile Network quality management deals with the recognition and tracing of the main failure reasons, the definition of these failure reasons and their effects on the network, and the optimization of procedures to avoid and eliminate sources of failure as much as possible. Network quality measurement consists of measuring the quality of services, comparing them with competitors, realizing random or scheduled measurements, examining customer complaints, and describing measurement results and usage. Based on these quality measurements and performance/statistics reports, network optimization can be performed (e.g., regular replanning of the cells, fields, regions and the complete network).

The help desk is the interface between the customer service center and the outage system. It is mainly responsible for filtering and processing of network problem data, receiving and analyzing customer problem reports and complaints, initiating appropriate actions to resolve the problem, and the global coordination of the problem resolution process. In addition to service maintenance, the help desk provides support for existing and new services installation and network configuration.

Operational network control consists of maximizing network availability and traffic throughput on an hour-by-hour basis across the whole network. It performs a large number of tasks mainly in an advisory capacity or acting as an agent for other departments, e.g., certain regional problems outside normal working hours. Some of its other activities are: the allocation of priorities to major problems; the evaluation of the impact of major faults on network service; the sorting and handling of major problems; the dynamic monitoring of the mobile system; the provisioning of a management interface for operators; the technical management support and advice to customers interfaces outside the normal hours; and the provision of daily reports of major problems.

System maintenance involves dynamic network analysis, network technical support, and central preventive maintenance.

Mobile Network Management

Many of the management functions described previously apply to all types of networks (i.e., wired, wireless network, and their interconnections). Some management functions are specific to mobile networks due to the wireless nature of these networks. These are mainly: radio resources management; mobility management; and radio communication management. In a mobile network, radio transmission constitutes the lowest functional layer. In any telecommunication system, signaling is required to coordinate the necessarily distributed functional entities of the network. The transfer of signaling information in GSM for example follows the layered OSI model. On top of the physical layer is the data link layer providing error-free transmission between adjacent entities, based on the ISDN's LAPD protocol for the Um and Abis interfaces, and on SS7's Message Transfer Protocol (MTP) for the other interfaces. It is the functional layer, above the data link layer, that is responsible for Radio Resource (RR) management, Mobility Management (MM) and Call Management (CM).

The RR management functionality is responsible for providing a reliable radio link between mobile stations and the network infrastructure. The main functional components involved are the mobile station (MS), and the Base Station (BS) subsystem, as well as the Mobile Switching Center (MSC). The RR management function establishes and allocates radio channels on the Um interface between the MS and BS, as well as the establishment of A-interface links between the BS and the MSC. Handover (handoff) procedures, an essential element of cellular systems, is managed at this layer. Several protocols are utilized between the different network elements to provide RR functionality. An RR-session is always initiated by a mobile station through the access procedure, either for an outgoing call, or in response to a paging message. The details of the access and paging procedures, such as when a dedicated channel is actually assigned to the mobile, and the paging sub-channel structure, are handled by the RR management. Also handled here is the management of radio features such as power control, discontinuous transmission and reception, and timing advance.

Mobile network management standards adopted the concept of Telecommunication Management Network (TMN) defined in ITU Recommendation M.3010. TMN has been successfully applied for the management of GSM networks for example. Models for the management of a GSM network also exist in standards. In particular, the application of TMN principles have consisted of the definition of Q3 interfaces between operating systems (OSs) and network elements (NEs) in mobile networks. The various functional blocks (MSC, BS, etc.) are combined in a NE (e.g., MSC Function and Visitor Location Register (VLR) Function in a single NE-MSC/VLR).

Automated Fault Management

There are several existing knowledge-based and artificial intelligence (AI) techniques that can be used for fault diagnosis. Five categories relevant to fault diagnosis are identified: fault-based techniques, model-based techniques, case-based reasoning techniques, machine learning for knowledge acquisition, and integrated diagnostic techniques. A description of the techniques and how they apply to diagnosis follows.

Fault-Based Diagnostic Techniques

Fault-Based Reasoning (FBR) is used in many diagnostic systems and reasons on the basis of common faults and troubleshooting to isolate a problem and suggest a subsequent repair. The knowledge in these systems is primarily based on repair manuals and heuristics (rules of thumb) of experienced technicians. The knowledge is often represented as rules or frames in diagnostic networks or troubleshooting hierarchies.

At the top level of the hierarchy is the general knowledge representing a problem with the device. This general problem is refined systematically until the terminal nodes of the hierarchy, which represent physical repairs or adjustments to the device components, are reached. After these repairs are achieved by a human technician, some systems retest to confirm that the fault or faults diagnosed by the system are resolved by backtracking through tests in the hierarchy.

Two major problems with FBR are acquiring the knowledge base and dealing with new faults. Fault-based reasoning systems do not learn new knowledge as they are used and thus are inadequate at detecting novel faults. Also, once encoded the knowledge is difficult to update and maintain. As a result, the case-based and model-based reasoning approaches were developed. Despite its shortcomings, FBR has remained an attractive way of developing diagnostic tools. There have been many successful systems based on FBR.

Model-Based Diagnostic Techniques

Model-based diagnostic techniques describe reasoning on the basis of quantitative or qualitative device models to diagnose failures. Quantitative models include simulations and numerical models. Qualitative models include structural, behavioral, and functional black box models.

Model-Based Reasoning (MR) for diagnosis concentrates on reasoning about the expected and correct functioning of a device. Models in MR range from quantitative to qualitative ones and all attempt to accurately approximate device behavior. Once a device model is stabilized, the observed behavior of the device can be predicted. If a discrepancy in behavior is detected, possible candidates, based on assumed components faults, can be generated using assumptions that describe correct model behavior. Sequential diagnosis is used on choose observations, augment a prediction for the candidate faults, and update the list of candidates until a dominant candidate is found.

Although model-based reasoning is less mature than FBR, recent applications developed using MR techniques have proven that it is a viable technique for diagnosis. However, MR is applicable only where a sufficiently good model can be built. Also, MR systems are computationally expensive and have an exponential increase in search complexity as they attempt to detect a fault for a complex device. Also, models are approximations of an artifact and as a result may not accurately illustrate its faults.

Case-Based Reasoning Techniques

Case-Based Reasoning (CBR) techniques examine past cases and use the results of past case solutions to make recommendations to the user. Although not widely applied to diagnostic applications, this technique is quite relevant to diagnosis.

CBR is the ability to reason on the basis of past problem solutions. CBR allows a system to learn from experience and build up an episodic memory, much like a human. Key issues in achieving this include indexing cases, representing features, adapting cases to new problems, repairing a case that has failed in providing a solution, and generalizing cases for learning in CBR. Recent implementations have included CBR shells. CBR has been applied successfully to many problems, including negotiation, planning, design, and cooking.

Case-based reasoning has been combined with other techniques in AI such as FBR, MBR, simulators, explanation-based learners, and genetic algorithms in an attempt to make CBR more flexible. CBR has had limited application in diagnosis because FBR can be viewed as a form of organized CBR. Diagnostic systems may be able to reason more quickly if they have a case-based component, since CBR speeds up repetitive diagnoses. However, case-based reasoning systems are case-specific and their cases are not easy to generalize; their utility becomes a function of indexing and searching the case base.

Machine Learning for Knowledge Acquisition

Machine learning, which includes empirical and analytic learning, is a key approach in knowledge acquisition. Empirical learning focuses on learning for classification (including learning rules from data for diagnosis). Analytic learning addresses learning for problem-solving tasks. Such tasks include planning, design, natural language understanding, control, and execution. There has been an explosion of work in machine learning in recent years. It is viewed as one of the key approaches of reducing the knowledge acquisition bottleneck.

Learning using classification is one of the more mature machine-learning techniques. Classification algorithms take positive and negative instances and build classification trees that can be pruned to provide rules that represent the examples. Explanation-based learning (EBL) is a form of analytic learning that takes positive and negative examples and uses background knowledge (domain theory) to generate and generalize an explanation for the example. This is a form of speed-up learning that is used to derive generalized knowledge from specific knowledge. It is also useful in making a knowledge base more compact so that reasoning paths may be shortened.

In classification, learning rules are extracted from positive and negative examples. Classification learning has been applied to problems in diagnosis, planning and design. Explanation-based learning is speed-up learning, which implies that it is intended to learn knowledge that could help perform a task faster. Explanation-based learning has been applied to the problem of generating and refining rules for diagnosis.

Machine learning, however, remains in its infancy in addressing complex real-world learning. Machine learning for data interpretation requires the compilation of libraries of healthy and fault patterns for the performance of a device. These libraries do not provide knowledge-rich structures or justifications for device behavior or failure.

Integrated Diagnostic Techniques

Integrated diagnostic techniques are a combination of knowledge-based techniques for diagnosis. The following techniques are often combined:

Data analysis and interpretation, including the use of machine learning for diagnosing faults;

Reasoning based on common faults and troubleshooting to isolate the problem;

Reasoning on the basis of numerical or behavioral models to diagnose failures; and Examining past case solutions and using the results to diagnose new faults.

Many researchers are developing hybrid (integrated) systems. Some systems are using model-based reasoning (MBR) to support a fault-based reasoning (FBR) system. Model-based reasoning is used to detect novel faults while FBR is used to quickly diagnose common faults. Some systems are using machine learning to extract symptoms from sensor data using data interpretation so that a FBR system can be used for diagnosis in an on-line mode. Such an approach simplifies the device monitoring since sensor data is interpreted and then relayed to a failure driven reasoner for a fast diagnosis. Other systems combine sensor data interpretation with MBR to eliminate health components from consideration in a diagnosis and are more quickly zeroing in on components whose behavior deviates from the expected behavior. Cases of previous failures are being indexed and used to speed-up diagnosis while combining case-based with fault-based reasoning. Cases of previous failures are also being used to speed-up model-based diagnosis.

A single strategy for diagnosis does not seem to be suitable, especially for complex problems. An integrated approach is superior because complex systems inevitably require real-world hybrid solutions.

Today's telecommunication networks are highly advanced, rapidly evolving and made of complex, interdependent technologies. As telecommunication networks fuse with computer networks, and as the underlying technologies continue their rapid evolution, these networks will become increasingly difficult to manage. AI techniques are needed in telecommunications, especially mobile telecommunications, for supporting the decision making process and thus allowing a high level of automation. The main advantages are to reduce the complexity of the management task and to free human operators.

The aspects of fault management covered by existing automated management systems for mobile telecommunications networks are essentially limited to fault monitoring and alarm handling. There is no complete application developed for the management of faults for the whole mobile network since emphasis has been given to the management of problems at the level of single equipment, mainly base stations.

Some of the existing fault management tools based on AI techniques are:

(1) An expert system for restoring services by automating problem diagnosis, recommending repairs, and dispatching technicians.

(2) Several AI-based tools for alarms analysis and fault diagnostics including an expert system shell to build assistants for real-time network alarm correlation in wireline and cellular networks.

(3) An expert system which allows the reception of customer trouble reports, uses a database to determine appropriate circuit tests, conducts the tests, diagnoses problems, and makes dispatch decisions.

(4) An expert system dedicated to network traffic management. It receives network performance data from groups of switches, recognizes and interprets anomalies, plans solutions, and, with user approval, installs appropriate controls and monitors.

(5) An expert system used for fault diagnosis and tuning of cellular networks.

(6) A knowledge-based system which is an internal help desk application to help maintenance administrators use the software that predicts and reports phone-line problems.

(7) A multi-agent, event-driven system which allows on-line monitoring and control for cellular networks. The system minimizes signal interference and increases equipment use in real-time.

Like wireline telecommunications networks, mobile networks face the challenge of guaranteeing a high level of network availability and a good quality of service for customers. For that purpose, efficient, intelligent and automated management systems must be provided for the supervision and control of mobile networks. An advantage of using AI techniques for this purpose is to keep in-house the experience and knowledge acquired by human operators when these operators leave or retire. In general, it also leads to less training activities and lower personnel costs. Another advantage is that the system can evolve more efficiently as new knowledge is added and stored in the light of operational experience.

The state of the art reveals the limited coverage of automated fault management systems in mobile networks.

A number of problem areas have been identified with the current trouble shooting process and tools. In a typical scenario, more than one person is trouble shooting, and one team member (lead troubleshooter) is in charge of guiding the team. The lead troubleshooter reasons with the rest of the team on the possible root of the cause. Once the possible locations are identified a diagram is drawn by hand to obtain a better visual understanding of the problem at hand. An iterative process follows in which the team decides on the best signal to trace given the circumstances; trouble shooting tools are utilized to manually place a trace on the signal(s) in the switch; the switch is activated to perform certain functions that activate the trace; and the trace is downloaded and analyzed by the team members for a solution. If no solution is found, the process is repeated with different signals being traced.

The current trouble shooting process requires a great deal of human intervention, which can lead to misinterpretation and error. The current process is of a reactive nature; trouble shooting takes place only after a fault has caused an error or a failure in the system. This means that the customer is experiencing problems, and there is pressure to find a solution as quickly as possible.

In addition to requiring a great deal of human intervention, the process is knowledge-intensive. Given the complexity and size of the software, understanding and reasoning about the system requires considerable effort. Good trouble shooting expertise can only be mastered after years of front-line trouble shooting. Filtering the large volumes of data and choosing the correct tool from the large set of tools available also cause problems. Due to the vast number of possible scenarios, there is no explicit, global trouble shooting methodology that can be utilized by troubleshooting team members. Clearly, there is a definite need for more effective handling of both hardware and software faults.

Although there are no known prior art teachings of a solution to the aforementioned deficiency and shortcoming such as that disclosed herein, U.S. Pat. No. 5,408,218 to Svedberg et al. (Svedberg) and U.S. Pat. No. 5,297,193 to Bouix et al. (Bouix) discuss subject matter that bears some relation to matters discussed herein. Svedberg discloses a model-based alarm coordination system which coordinates primary and secondary alarm notifications in order to ascertain whether they are caused by a single fault or multiple faults in a complex electronic system. The alarm coordination function is part of a larger overall Fault Management Support (FMS) system. The procedure disclosed in Svedberg, therefore, may be utilized within the SFM system of the present invention to perform the fault localization process, but Svedberg does not disclose an overall SFM system providing for proactive monitoring of the cellular network, and trouble shooting expertise and assistance.

Bouix discloses a wireless telephone network which includes a centralized service management system linked to fixed stations by Integrated Services Digital Network (ISDN) links. The fixed stations detect faults and transmit maintenance messages over the ISDN links to the centralized service management system. However, Bouix does not disclose an overall SFM system providing for proactive monitoring of the cellular network, and trouble shooting expertise and assistance.

Review of each of the foregoing references reveals no disclosure or suggestion of a system or method such as that described and claimed herein.

In order to overcome the disadvantage of existing solutions, it would be advantageous to have a SFM system which increases the level of automation of system operation and maintenance activities, thus reducing the turnaround time, the associated cost, and releasing as much as possible human operators and trouble shooting experts. Such a SFM system provides for proactive monitoring of the cellular network, and trouble shooting expertise and assistance, thereby anticipating and preventing catastrophic impact of faults on cellular network services. The present invention provides such a system, enabling cellular system operators to face the challenge of increasing complexity of software management in current and future cellular switching systems.

SUMMARY OF THE INVENTION

The Software Fault Management (SFM) system of the present invention has modeling and reasoning capabilities developed utilizing Advanced Information Processing (AIP) techniques. Distributed Artificial Intelligence such as an intelligent multi-agent system is utilized to contain the complexity of the network management task through its automation. The intelligent SFM system operates in an on-line proactive SFM mode, and performs on-line/off-line corrective processing of software faults. The SFM system performs more than just solving the diagnostic problem for software functional blocks. It also copes with a large number of fault reports, formulating and verifying hypotheses, and assisting engineers in carrying out repairs, together with executing the necessary preventive actions.

To solve all these different tasks, AIP techniques are utilized mainly for explicitly modeling the cellular switching network and its behavior, and using a knowledge base and intelligent multi-agents systems to perform proactive and reactive reasoning on this model.

The SFM system is developed in a generic way so as to be independent of technology-specific implementations by representing the underlying switch design knowledge in a modular and easily changed form which is then interpreted by the SFM reasoning mechanisms. A clear separation is maintained between the generic procedural knowledge (i.e., the inference mechanisms and agents) and the specific declarative knowledge (i.e., the specific and explicit models of the different network elements of a mobile telecommunications network). The SFM system is an integrated collection of autonomous agents to support the SFM of the cellular network. The SFM agents, each working on different network elements and/or on different aspects of the SFM process cooperate in order to provide additional and more global information to assist in the diagnosis of problems in the network.

Thus, in one aspect, the present invention is a Software Fault Management (SFM) system for managing software faults in a managed mobile telecommunications network. The SFM system includes an Intelligent Management Information Base (I-MIB) comprising a Management Information Base (MIB) and a Knowledge Base (KB) having a functional model of the managed network. The SFM system also includes an intelligent multi-agent portion having a plurality of agents which process the software faults utilizing information from the I-MIB. The intelligent multi-agent portion utilizes model-based reasoning to process the software faults. The KB may include a trouble report/known faults (TR/KF) case base, and the intelligent multi-agent portion may utilize model-based reasoning in combination with case-based reasoning to process the software faults. Fault management is both proactive and reactive.

In another aspect, the present invention is a method of managing software faults in a managed mobile telecommunications network. The method begins by storing a Knowledge Base (KB) in an Intelligent Management Information Base (I-MIB), the KB including a functional model of the managed network. The method also includes the steps of storing a Management Information Base (MIB) in the I-MIB and processing the software faults with a plurality of agents in an intelligent multi-agent system utilizing information from the I-MIB.

In yet another aspect, the present invention is a method of proactively managing software faults in a mobile telecommunications network. The method begins by storing knowledge in a knowledge base, the knowledge including a functional model of the network, fault models, and fault scenarios; monitoring the network for observed events and symptoms; and determining a suspected fault to explain the observed events and symptoms, the determining step comprising comparing the observed events and symptoms with stored performance data and statistics, and analyzing the comparison with the stored knowledge. This is followed by determining whether the suspected fault is a known fault; implementing a preventive solution upon determining that the suspected fault is a known fault; and performing a fault trend analysis upon determining that the suspected fault is not a known fault. This is followed by performing diagnostic tests; determining whether a successful diagnosis was obtained; performing a fault localization process upon determining that a successful diagnosis was obtained, the fault localization process including analyzing relationships between components involved in the diagnosis of the fault; and providing diagnosis and localization information to trouble shooters.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
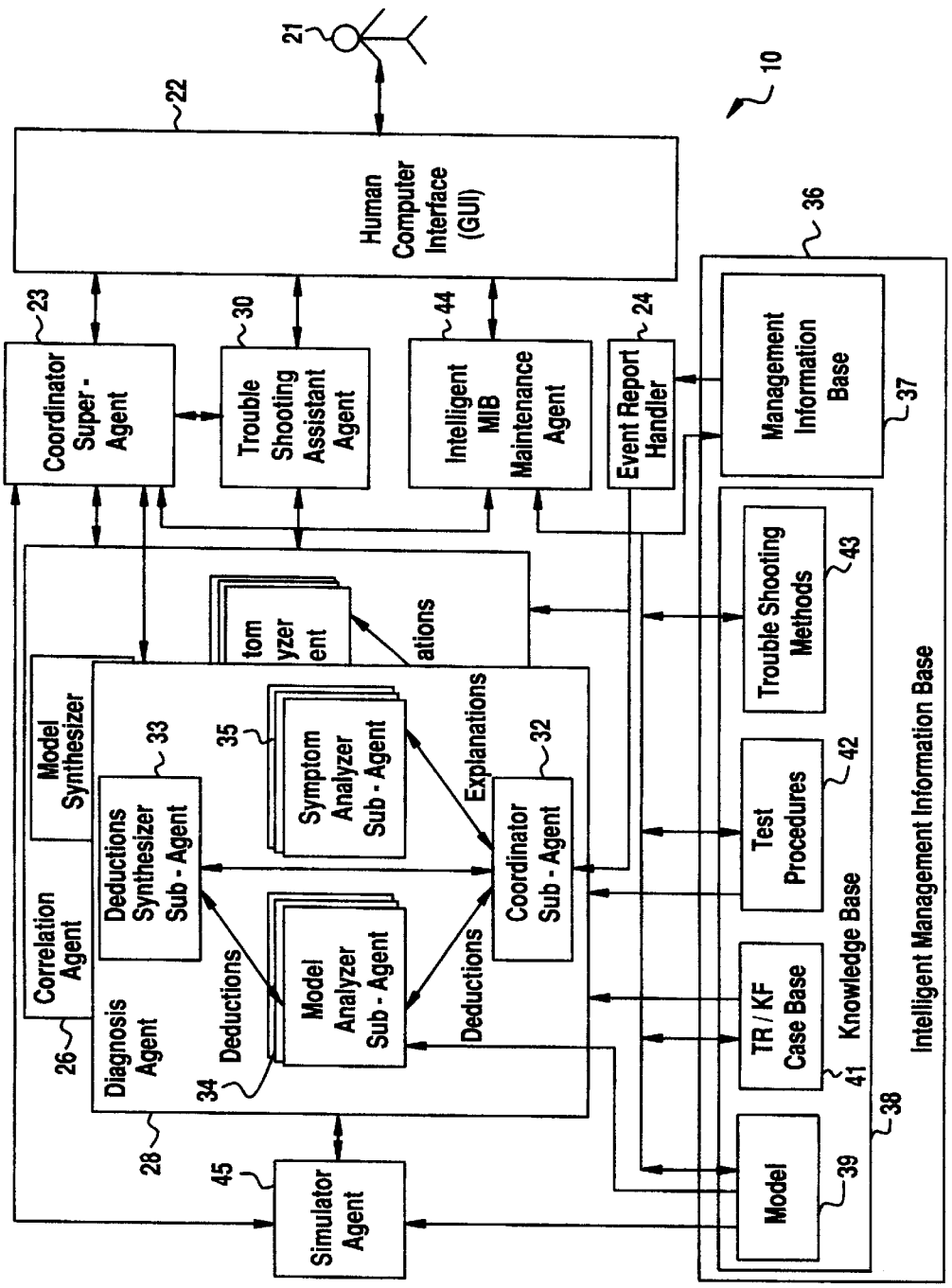
FIG. 1 is an overall functional block diagram illustrating the functional components of the SFM system and interactions between the SFM system and human operators through a Graphical User Interface (GUI)

The following terms may be utilized in the detailed description to follow:

KBS: Knowledge Based System.
CBR: Case Based Reasoning.
TAC: Technical Assistance Center.
GPMS: Global Problem Management System.
GRC: Global Response Center.
SMS: Service Management System.
CSE: Customer Support Engineer.
CSO: Customer Support Office.
HD: Help Desk The present invention is an integrated and intelligent software fault management (SFM) system for cellular telecommunications switching systems. It is compliant with Telecommunication Management Network (TMN) principles and framework. The SFM system is independent of technology-specific implementations. This is achieved by maintaining a clear separation between generic procedural knowledge (i.e., inference mechanisms and agents) and specific declarative knowledge (i.e., specific and explicit models of different network elements of a mobile cellular network).

The SFM system is an interactive knowledge based system that enables and speeds up trouble shooting. The system is preemptive in fault detection (i.e., it provides, before-the-fact event monitoring, fault analysis, and preventative actions). In addition, the system may be used by the troubleshooter in a reactive mode (i.e., it provides corrective actions to the troubleshooter once the trouble is detected).

The SFM system is an integrated collection of autonomous agents which support the software fault management of existing cellular telecommunications switching systems. The SFM agents, working on different network elements and/or on different aspects of the software fault management process cooperate in order to provide additional and more global information to assist in the diagnosis of problems in the cellular network.

Specifically, the SFM system handles on-line proactive software fault management and on-line/off-line corrective processing of software faults. Thus, the SFM system does more than solving the diagnostic problem for software functional blocks. It also copes with a large number of fault reports, formulates and verifies hypotheses, and assists engineers in carrying out repairs and executing the necessary preventive actions. In order to handle all these different tasks, Artificial Intelligence (AI) techniques are utilized for explicitly modeling the cellular switching network and its behavior, and for utilizing knowledge-based reasoning and an intelligent multi-agent system to perform proactive and reactive reasoning on the cellular network model.

The proactive monitoring of the managed cellular network occurs in a monitoring mode in which the SFM system continually monitors, through dynamic polling, the state and behavior of critical resources in the cellular switching system. It analyzes performance and historical data and detects possible abnormal behaviors of what would eventually disturb the service in order to predict, and hence prevent, the occurrence of potential software faults. For example, based on selected performance data and statistics, the system may recognize a progressive degradation of Quality of Service (QoS). The proactive monitoring of the cellular network can also be used to manage such areas as digital quality service, software and hardware fault management, network monitoring, system characteristics and performances, and traffic monitoring. The proactive mode is initially effective for those faults that are well known (e.g., have a precise fault model, being part of well modeled fault scenarios, having intermediate symptoms, etc.) but also applies to new classes of faults. When polling indicates that a potential fault may occur, additional verifications are performed. Preventive measures are then automatically taken (if available), or a notification is sent to the system users if automated preventive measures are not available.

The reactive capability is used when a fault is detected. For known faults (faults that have already been experienced), the reactive process is easier than for those faults that have never occurred before and for which no experienced knowledge exists.

Specific capabilities of the SFM system include:
Generating software trouble reports which detect failures at their incipient stage (prior to client calls and prior to serious failure);

Assisting trouble shooting based on trouble reports (i.e., determining the source of the problem—the function block most likely responsible for a given trouble report);

Automatically classifying new situations, matching similar trouble reports (TRs) to known faults (KFs);

Presenting and justifying diagnostic reasoning (conclusions) to the users;

Presenting the most accurate view of the managed system and the current status of TR resolution;

Learning from previous cases and by discovering patterns; and

Providing a framework to integrate current and future processes, tools, and documents associated with trouble shooting.

Classification of Faults

Several criteria can be used to classify faults. The objective here is not to provide an exhaustive fault classification guideline, but to identify the main faults that seem to be of the high priority to mobile telecomunications network maintenance activities. Faults may be classified on the basis of:

Priority of the Faults:
A: Higher level priority fault with complete impact and major disturbance on the system;
B: High level priority with no impact on call processing but severely affecting specific services or functions;
C: Lower level priority with external lower impact.

Timing Properties:
Intermittent fault: very hard to handle because they cannot be easily reproduced;
Permanent faults such as hanging are present and remain until they are cleared;

Nature of the Source of Fault:
Hardware faults caused by a hardware failure (cabling, board, etc.);
Software faults caused by a given software or software blocks failure (e.g., common charging output errors);
Software/hardware faults related to both software and hardware (e.g., restart, hanging).

Hierarchical Level:
Service faults (e.g., call delivery problem);
Network faults (e.g., trunk problem);
Network Element faults (e.g., loss of I/O devices);
System level faults;
Subsystem faults;
Functional block faults (e.g., wrong variable value setting);
Functional Unit fault (e.g., software design error, hardware break fault). A fault description model may combine all these classifications. Thus, a problem may have a priority A, be a permanent fault, have a software nature, and be located at a given block.

FIG. 1 is an overall functional block diagram illustrating the functional components of the SFM system 10 and interactions between the SFM system and human operators 21 through a Graphical User Interface (GUI) 22. To perform the complete SFM function, the communication between the key agents, event report management, correlation, diagnosis and repair has to be coordinated. For that purpose, a coordinator super-agent 23 is introduced to coordinate the overall SFM cycle. The coordinator super-agent also manages (creates instances, removes instances, etc.) the agents responsible for the different tasks involved in the SFM cycle.

Functional models can exist at different levels and for different components of the system to be managed. Thus, in the overall SFM process, there may be several instances of the agents involved in the SFM cycle.

Figure 2:
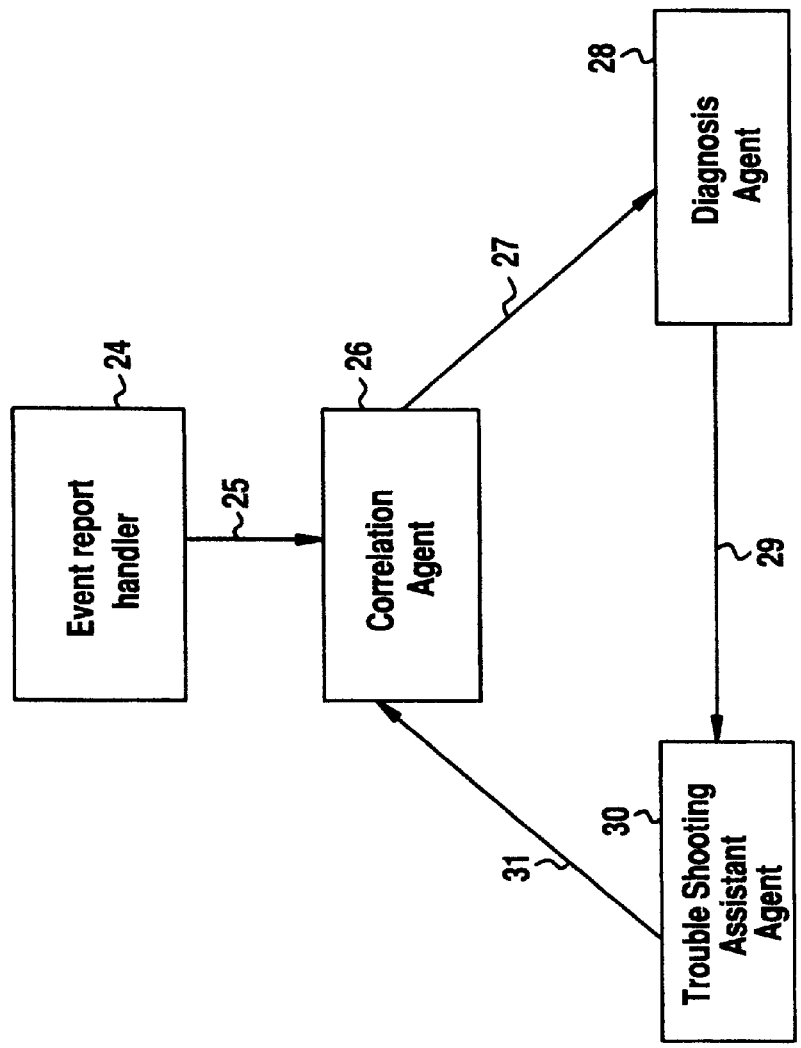
FIG. 2 is a flow chart illustrating a SFM cycle covering the complete SFM task from the first trouble report to the successful repair of the suspected component.

Referring to FIG. 2, there is shown a flow chart illustrating the SFM cycle covering the complete SFM task from the first trouble report to the successful repair of the suspected component. The different parts of the cycle are the main management functions identified, and are implemented by processes which act like independent agents piping their results to the next agent. The SFM cycle covers the complete SFM task from the first trouble report to the successful repair of the suspected component. The agents in the SFM cycle are responsible for separate tasks: event report handling, correlation, diagnosis, and trouble shooting.

An event report handler 24 accepts observed symptoms from switching systems (alarms) and trouble reports from network users, processes a simple form of time correlation, and sends fault reports 25 (containing fault symptoms requiring diagnosis and repair) to a correlation agent 26. The correlation agent takes the fault reports and uses the functional model to produce a minimal set of suspect components 27. The correlation agent formulates fault explanations. A specific feature of telecommunication systems is that one fault can result in a large set of similar symptoms. These symptoms must be correlated and associated with a small set of possible explanations. As there is no single fault assumption built into the reasoning process, each possible explanation can be a conjunction of single causes. The output of correlation is therefore a disjunction of explanations.

The diagnosis agent 28 analyzes and tests the suspect software components against their modeled behaviors under test to verify the explanations supplied by the correlation agent. The diagnosis agent may execute the tests either automatically or wit the help of a human operator. The output of the verification process is a diagnosis 29 of the identity of the software component which has to be corrected, or if no explanation could be verified, a message to the correlation agent.

A trouble shooting assistant agent 30 is implemented to assist in repair recommendations 31 when a successful diagnosis is reached for the fault specified. The trouble shooting agent may perform the actual replacement of the faulty functional block or correction of the software fault in die isolated block. In the case of software, the role of the trouble shooting agent is restricted to assisting the engineers in the debugging and correction tasks by providing them with access to helpful information and tools such as trouble shooting methods, test procedures and tools, etc. Several protective actions have to be carried out in order to perform the trouble shooting with only a minimal disturbance to the subscriber traffic. After the repair, the new component is tested again, and a success message is sent out.

Referring again to FIG. 1, the correlation agent 26 and diagnostic agent 28 are themselves coordinating several reasoning sub-activities performed by sets of cooperating generic sub-agents. Instances of the sub-agents with a specified identity are created and invoked on a set of symptoms or facts and a set of explanations produced. In the preferred embodiment, a coordinator sub-agent 32 coordinates activities between a deductions synthesizer sub-agent 33, a model analyzer sub-agent 34, and a symptom analyzer sub-agent 35.

Other groupings of sub-agents are possible and remain within the scope of the present invention. There may be as many sub-agent instances as required, because they do not interfere with each other. For example, if two SFM system processes are needed, one called correlation and one called diagnosis, then correlation may be run using a set of symptoms, then diagnosis on (typically) another set of symptoms, then correlation on further symptoms reported, etc. Some of the symptoms for the second run of the correlation process can be "symptoms" output by the diagnostic process.

In this manner, the multi-agents SFM system is designed as a three-layer hierarchy consisting of the coordinator super-agent 23 at the top level controlling the agents 26 and 28 dedicated to the basic SFM cycle tasks at the middle layer and, at the lower level, a set of sub-agents 32–35 realizing different reasoning, testing and knowledge maintenance activities.

The multi-agent portion of the SFM system 10 interfaces with an Intelligent Management Information Base (I-MIB) 36. The function of the I-MIB is described in detail in later sections. The I-MIB comprises a Management Information Base (MIB) 37 and a Knowledge Base (KB) 38. The KB 38 further comprises a network model 39, a Trouble Report/Known Faults (TR/KF) case base 41, test procedures 42, and trouble shooting methods 43. An I-MIB maintenance agent 44 connects the I-MIB to the GUI 22 and the Coordinator super-agent 23. The network model 39 also connects to a simulator agent 45.

An important functionality required by the diagnostic process is the network model 39 for the description of the managed mobile telecommunications network 15. The model must be accurate, maintained up-to-date, and capable of being rapidly accessed in order to provide network topology and configuration details for the network elements down to the functional block level. A Generic Network Information Model (GNIM), proposed by TMN Recommendations, may be utilized for developing the cellular network model 39. The TMN provides a technology-independent functional and physical architecture with standardized interfaces. In addition, other shared management information and knowledge such as the Known Faults (KFs) case base 41 and fault scenarios must be maintained for the diagnostic process.

The Intelligent Management Information Base (I-MIB)

The efficiency of OSI system management is due to the use of a common management information model to define how the resources of any kind can be managed. The foundation of the systems management activity is the management information base (MIB) 37 (FIG. 1), which contains a representation of all resources to be managed. The structure of management information (SMI) defines the general framework within which a MMB can be defined and constructed. The SMI identifies the data types that can be used in the MIB and how resources within the MIB are represented and named.

As noted above, the SFM system 10 of the present invention utilizes an Intelligent Management Information Base (I-MIB) 36. The I-MNB is a management information support structure that, in addition to the classic concept of a MIB representing information required for the management of the network resources, also includes a knowledge base 38 having knowledge such as the behavior of the managed resources in a given fault scenario or a propagation path of a known fault. A so-called "Knowledge and Reasoning" faction has been added to the basic MIB functionality of "Management Information and Access". The I-MIB 36 is encapsulated in an agent which not only performs the classic and simplistic role of a standard agent (i.e., searching for management information on Managed Objects (MOs) or invoking control primitives on MOs), but is also in charge of maintaining knowledge models and management information on resources operations, and providing reasoning and inferences based on the collected management information and knowledge/models.

The I-MIB 36 utilizes object-oriented modeling which is a simple and intuitive way to represent complex knowledge about the telecommunication system and the functional model, and to model the mobile switching system's model-based reasoning. This approach models telecommunication networks in a modular way. Objects are the primitive elements of this modeling approach. They comprise the behavior of the entities they represent and communication via messages. To structure the overall domain, the taxonomy of classes is built. The objects can be considered as instances of a class. There can be super—and subclasses, so that a hierarchical structure can be realized. Information can be inherited from super-classes to subclasses. Therefore, only the local information has to be stored separately in each object.

Managed objects are abstractions of data processing and data communication resources (hardware and software) for the purpose of management, and they are defiled as a management view of the resources they represent. A managed object is defined in terms of attributes it possesses, operations that may be performed upon it, notifications that it may issue, and its relationships with other managed objects. It is possible to have several managed objects that satisfy the same definition, which means they are managed in the same way. Thus, a managed-object definition is more correctly described as a managed-object class definition, and each managed object is an instance of a managed-object class. A managed-object class is a model or template for managed-object instances that share the same attributes, notifications and management operations. The definition of a managed-object class, as specified by the template, consists of:

Attributes that represent the properties of the resources (such as the operational characteristics or current states) visible at the managed object boundary;

Operations that may be applied to the attributes of an object or to the managed object as a whole;

Behavior that a managed object exhibits in response to a management operations;

Notifications emitted when some internal or external occurrence affecting the object is detected;

Conditional Packages that can be encapsulated in the managed object; and

The position of the managed object in the inheritance hierarchy.

All managed-objects that share the same attributes, behavior, operations, notifications and packages belong to the same managed-object class. To provide for a convenient means of reusing definitions in the creation of a new object class, the OSI structure of management information introduces the concept of inheritance. A new object class can be defined by adding additional attributes, operations, or notifications to an existing managed-object class. The new object class is referred to as a subclass of the old object class, and the old object class is referred to as a super-class of the new object class. All object classes ultimately derive from a unique object class referred to as "top". This is the ultimate super-class, and the other object classes form an inheritance hierarchy with top as the root.

A managed object of a particular class can contain other managed objects of the same and/or different classes. The containing managed object is known as the superior managed object and the contained managed objects are known as the subordinate managed objects. The top level of the containment tree is referred to as the root, which is a null object that always exists. The containment relationship is used for naming managed objects. The unique path through the tree structure to a particular object gives a unique concatenation of names that identify a particular managed object.

Guidelines for the Definition of Managed Objects (GDMO)

ISO/OSI has defined Guidelines for the Definition of Managed Objects (GDMO). GDMO is the international standard that defines the notation used to specify managed object classes that permit the management of resources. The standard also provides a managed object definer with background information and guidance to assist in the process of definition. GDMO provides the link between the abstract modeling concepts contained in the Management Information Model and the concrete requirements for specifying particular managed object classes. GDMO includes definitions of the syntax and semantics of the notations that the managed object definer must use when specifying managed object classes.

This section provides an example of GDMO specification of the central switching component (MSC/VLR) software part of the mobile network as a MO (Managed Object). This description is based on the guidelines provided within "ISO/IEC JTC1—Draft Document for system management: Software management function." As described in Appendix D of that document, the abstract representation of the components to be managed in the TMN standard is based on the use of GDMO templates defined within ISO/OSI management (ISO95).

The notation used for defining managed object classes is based on the concept of templates. The definition of the templates describes the overall syntax of the applicable portion of specifications including the order in which components of the specifications may appear, which components may be omitted, which may be repeated, and what each component may consist of. In order to specify the elements contained in the definition of a managed object class, nine separate templates have been defined: managed object class, package, parameter, attribute, attribute group, behavior, action, notification, and name binding. The examples in Appendix A and Appendix B illustrate how a managed object class definition is built up by using the template notation defined in GDMO. Comments included in the template definition (preceded by—) and text following the template definitions are used to describe the features of the managed object class and how they are built up.

Registration: The process of defining managed object classes requires the assignment of globally unique identifiers (object identifiers) to various aspects of the managed object class name, attribute types, etc. The values of these identifiers are used in management protocols to uniquely identify aspects of managed objects and their associated attributes, operations and notifications. It is therefore a necessary precursor to the development of a managed object class definition that the standards body of organization concerned identify or establish a suitable registration mechanism that is capable of issuing object identifier values for its use.

Inherited Characteristics: The process of inheritance results in the inclusion of all characteristics of the super-classes of the managed object class in the managed object class definition.

Consistency: The objective is to reduce the burden upon the managed object definer by encouraging reuse of existing definitions of components of managed object classes by referring to other standards that are sources of generic definitions.

In the I-MIB 36, reasoning capabilities are integrated with the MIB's common core of network management knowledge. The I-MIB is the central institution through which all management actions must pass, and the intelligent services (realized with model-based reasoning) are the main functionality of network management. This provides a common management core through which consistency is guaranteed and double or contradictory actions can achieve conformance to standards.

Since the I-MIB 36 uses managed objects and standard interface protocols, it can operate with any network resource or any other manager which conform to the protocol standards. The standard protocols may be utilized to integrate existing management functions by accessing them via these protocols. Although the I-MIB can support standards concepts, it is not restricted to them.

Tus, the I-MIB 36 provides a uniform and integrated platform for management support and for knowledge representation as well as for reasoning. It provides a generic architecture for mobile networks. Ease of maintenance, updates, additions, growth, and development are greatly improved over existing systems. The SFM system 10 represents the advantages of object oriented techniques and distributed operations. Finally, the I-MIB enables the use of new applications like Internet, Unix HLR, Intelligent reasoning, IN services, etc.

The I-MIB 36 thus integrates the following features:

Object-oriented modeling, a simple and intuitive way to represent complex knowledge about the telecommunication system utilizing the functional model and the modeling of the cellular switching system.

Model-based reasoning, which accounts for the "intelligence" in the I-MIB 36 by integrating reasoning capabilities with the MIB 37.

Common core of network management by having the I-MIB as the central institution through which all management actions must pass, and by having the intelligent services (realized with model-based reasoning) as the main functionality of network management. The I-MIB provides a common management core where consistency is guaranteed and double or contradictory actions can be achieved.

Conformance to standards. Since the I-MIB uses the concept of managed objects and standard interface protocols, it can operate with any network resource or any other manager which conforms to the standards. The standards protocol may be utilized to integrate existing management functions by accessing them via these protocols. Thus, although the I-MIB supports standards concepts, it is not restricted to them.

Automatic consistency within the SFM Knowledge Base 38, especially during knowledge acquisition.

An environment which supports knowledge acquisition and knowledge SFM.

A uniform and state-of-the-art human-computer interface 22 for all aspects of network Operation, Administration, Maintenance and Provisioning (OAM&P). This comprises an operator interface through which all operator management actions are achieved.

Although the I-MIB 36 is a common core for network OAM&P, the I-MIB may be implemented in a distributed architecture which is more compatible with the distributed nature of mobile telecommunications networks. Therefore the I-MIB may be distributed logically and physically, and interaction can take place between different managers which are responsible for parts of the whole model, i.e., for their respective management domains.

Modeled Information Processing Techniques

There are different techniques for processing the modeled information. For knowledge-based systems (KBS) the processing is handled by a inference engine using reasoning techniques such as Model Based Reasoning, Rule Based Reasoning or Case Based Reasoning.

Telecommunication networks are characterized by their behavior and structure. Both, behavioral and structural knowledge can be modeled and used by the Model Based Reasoning approach. Knowledge model Based Reasoning differs from Rule Based Reasoning, where rules contain shallow expert knowledge. Model Based Reasoning can be either based on a model of the "working" system or the "not working" system. In this case, both the "working" and the "not working" system are modeled by a set of production rules. A detected symptom is matched against these production rules in order to find the possible faults.

The Case Based Reasoning approach uses a knowledge base built of standard cases. Each case has to be coded as scripts based on the experience gained from the working system. The different cases represent a well-defined application field. Each problem handled by the reasoning mechanism is, if possible, manned into an existing case stored in the knowledge base. Hence, this technique is suitable for applications, which can be reduced to a small set of already available and known cases. This means that the development of the case base has to be completed in order for the case knowledge to be available.

For complex scenarios, where the domains that are managed are distributed, it is essential to have a Tool that allows for a good overview of the whole management system. This implies the need for a conceptual definition of management domains, the assignment of managed objects to domains and the need of access control.

The Knowledge Base (KB)

The success of the SFM system 10 depends heavily on its Knowledge Base (KB) 38. The acquired knowledge needs to be correct and kept up to date. Knowledge acquisition is therefore an important task. The knowledge bases to be used for the SFM system are implemented as an integral part of the I-MIB 36. The I-MIB is the conceptual information store for all management aspects of the TMN, with SFM being one important part of management. The knowledge bases are part of the SFM system which supply detailed information describing the structure and behavior of the target cellular switching network. The Knowledge Base 38 can be divided into the following parts:

The model 39 which includes the physical structure of the network (switching software, control software, switches etc. and their position and interconnections); and functional behavioral knowledge;

The Trouble Reports/Known Faults (TR/KF) case base 41 which includes a test behavior functional model for software components;

Test procedures and planning rules 42 which include diagnostic information about available tests; and Trouble shooting methods 43 which include repair information.

Knowledge Acquisition and Representation

The SFM system 10 of the present invention utilizes integrated intelligent agents to support users in acquiring and representing mobile telecomunications network knowledge. These agents allow the representation of network elements and their connectivity (e.g., the switch software blocks and their relationships depending on the mobile service logic) within the Knowledge Base 38. The representations may be graphical and correspond to the concepts of abstract classes and instances of the MIB. The agents implement several object management operations (e.g., add, remove) and other transactions of knowledge within the knowledge base in order to keep the knowledge base consistent. Browsing facilities are also provided by the agents to cover all classes and instances in the knowledge base.

In addition to structural representations, the agents provide facilities to describe the functional behavior of the cellular switching system components. The behavior is normally described in the form of rules (e.g., if-then-rules) which are attached to the defined classes in the Knowledge Base 38. The acquisition and representation agents also enable users to interact with the system reasoning agents to test rule behavior and to perform simulations and inferences on the mobile switching system model 39 as represented in the I-MIB 36.

The Knowledge Base 38 generated by these agents contains a model description 39 of the mobile switching system and software blocks and their corresponding graphical representation. The relationships between the system components are described on a per-mobile-service basis. This stored information is then utilized by the other reasoning agents of the SFM system. The interaction with users (i.e., knowledge engineers, cellular telecommunication experts, troubleshooters, etc.) is implemented at the level of an interactive and user friendly human computer interface 22 (e.g., graphical, multi-windows, browsing facilities, etc.).

The Functional Model

The functional model 39 is built out of functional entities which correspond to specific functionality of the modeled mobile switching system. A functional entity may be, for example:

A switch functional block (e.g., MTA "Mobile Telephone A-Subscriber" Block);

The functionality of transmitting a signal from one functional entity (e.g., MTA) to another functional entity (e.g., RE "Register" functions Block); or The behavior of a test and the corresponding test results. There is a mapping between the functional entities of the functional model and the elements of the physical model. This mapping is not necessarily a one-to-one mapping.

In the context of the SFM system, a functional entity corresponds to a software block. It is connected to other functional entities so as to realize the overall switching system functionality. The connections are logical and materialized by signal exchanges depending on the mobile service logic supported by the mobile switching system. The functional entities together with these block-to-block connections comprise the functional model.

As stated previously, an object oriented approach is utilized to represent the structure, relationships and behaviors of the software blocks in a modular and declarative manner. Behavior is associated with functional block classes and reflects the following principles:

Only local behavior is described by means of rules which go from cause to effect;

Working and faulty behavior may be represented using the same formalism. If a functional block fails in a number of ways, and knowledge about the failure model is known, then this is also encoded in the Knowledge Base 38 to be used by the reasoning multi-agents system; and The rules are formulated in an abstract way. A rule is implemented only when it is required by an application.

Behavior defines the function of a managed object for the purpose of reasoning by a model-based reasoning system. Such behavior defines how a managed object works, and why it does not work. Behavior can be created and tested using either abduction (inference) or deduction (simulation). For example, if the behavior of working buffers is added to the managed object representing a software block involved in a call delivery, the block can be tested deductively by implementing a new call delivery and watching the effect on the target software block (i.e., a hanging occurs as all buffers are occupied). It can also be tested abductively by asking the reasoning multi-agents system what is the cause of the hanging situation. The system would reply that command, device, subscriber, or function (e.g., hanging backups) is faulty.

Several functional entities can be linked together to perform higher-order functions. This concept is very appropriate for mobile telecommunications networks and is incorporated into the model as different levels of granularity of the functional entities. The entities are connected via a has-part/is-part-of relation. Aggregation relations are described in the TMN Generic Relationship Model (GRM). In a representative mobile switching system, the software part is organized into four levels, namely system, subsystem, functional block, and functional unit levels. Most of the reasoning of the SFM system 10 is conducted down to the third level. Due to the large number and size of functional units, and the inherent reasoning complexity, the functional unit level which has the finest granularity is not addressed.

Reasoning With the Functional Model

The core of the SFM system 10 is the reasoning multi-agents system which utilizes the I-MIB 36 described earlier in order to identify faulty software blocks. The distributed and modular nature of the SFM system enables the system to be adapted and enhanced to meet particular requirements. The cooperating agents act autonomously, and may be simultaneously reasoning on different components of the managed system. Similarly, and to make the system highly generic, the agents may be applied to different functional models within the fault management task, such as correlation of trouble reports, and test management. The correlation agent 26 takes the fault symptoms (in the form of trouble reports or alarm reports) and uses the I-MIB and the functional model 39 to produce a minimal set of suspect software blocks.

In the diagnosis agent 28, suspect blocks are first mapped to other blocks which have their behaviors-under-test modeled. Secondly, the reasoning process is applied to the new blocks in order to produce a diagnosis of the situation. Then, in the trouble shooting assistant agent 30, an interaction with the human repair engineer is implemented to precisely identify the error within the identified software block and correct it. In this manner, the system agent interacts with the user to provide the links with tools necessary to support such engineering activities as the known faults database, browsing, and test tools. Finally, the system ensures the logging of the fault specification and the undertaken corrective actions for future utilization.

Generic Reasoning Agents

In order to implement the correlation and diagnostic processes, different kinds of reasoning activities are needed (e.g., based on the functional model, the fault symptoms, etc.). These activities are performed by a set of cooperating sub-agents acting as correlation and/or diagnostic agencies.

The symptoms analyzer sub-agent 35 produces a set of abductive explanations for a given set of symptoms. The symptoms are observations from the failure situation. The explanations are derived from the knowledge of the causes of the failure, i.e., those satisfying the failure conditions. There are at least two kinds of explanations that can result from the analysis process. The first is based on the knowledge in the model 39 and assumes that the modeled behavior represents all the ways the network 15 can fail. In this case, the symptoms analyzer sub-agent inspects the MIB 37 and, depending on the state of the block inspected, the symptoms analyzer sub-agent uses this information to limit the work required to produce the explanations of the symptom. A second kind of explanation encodes heuristic and experiential knowledge and is used directly to generate explanations. The symptoms analyzer sub-agent may also be guided by the strategic control heuristics in the Knowledge Base 38. In both cases, the symptoms analyzer sub-agent 35 reasons and outputs its conclusions as explanations to the coordinator sub-agent 32.

The coordinator sub-agent 32 is the core of the intelligent architecture. It controls the invocation of the other agents of the SFM system and synthesizes their results to produce explanations. It constructs the explanations from those generated by the symptoms analyzer sub-agents 35 from each symptom, from consistency information available from using the model analyzer sub-agent 34, from the operational state values, and the behavior.

There are at least two kinds of agent control strategies followed by the coordinator sub-agent 32. The first strategy is motivated by the heuristic that faults are likely to show themselves by symptoms near the actual cause. Possible explanations are generated by the symptoms analyzer sub-agent 35 in the order that the functional blocks were encountered traversing upstream causally from the symptom. The coordinator sub-agent 32 computes the explanations for all the symptoms. In another strategy, each functional block has a probability associated with its working-status internal state (if applicable). The coordinator sub-agent 32 performs a best first search through the set of possible explanations constructed in a similar way to the first case but sorted by probability. The coordinator sub-agent is typically the one that interacts with higher level agents, namely correlation agents 26 and diagnostic agents 28.

The model analyzer sub-agent 34 performs deductions from a hypothetical explanation (i.e., context explanation). It utilizes only those rules which are appropriate in the context. The MIB 37 is queried for the state values of the involved managed objects, and the model analyzer sub-agent 34 determines if the context explanation is consistent. The coordinator sub-agent 32 invokes the model analyzer sub-agent with partial explanations, i.e., those which account for the symptoms incorporated to date. If the context is found to be inconsistent, no more rules are used, and the hypothetical explanation is removed from the search by the coordinator sub-agent.

The model analyzer sub-agent 34 performs two main functions: rule generation and rule interpreting. Rule generation consists of taking the rules as written for the functional blocks (which refer to internal states, operational states, and intermediate states) and utilizing the connectivity information (signal transmission) to generate rules that explicitly refer to adjacent functional blocks. Rule generation is also performed by the symptoms analyzer sub-agent 35 for a similar purpose. Once a rule set has been generated it is saved so that it need not be generated again. The model analyzer sub-agent 34 then performs its rule interpreting by testing these rules and by passing the deductions together with their justifications to the deductions synthesizer sub-agent 33.

The simulator agent 45 is a stand-alone version of the model analyzer sub-agent 34 which is utilized in the initial construction of the model 39. The simulator agent assists in ensuring that the knowledge is consistent.

The deductions synthesizer sub-agent 33 acts as a cache for the deductions generated by the model analyzer sub-agent 34. As the model analyzer sub-agent picks out the part of the model 39 to apply deductions to, the deductions synthesizer sub-agent builds up a network of nodes including, for each node, the functional blocks structure to record all the supporting assumptions of the deduced propositions. It also maintains a list of inconsistent combinations of assumptions which are used by the coordinator sub-agent 32 to prune the task trees by deleting those nodes and then the blocks that have an inconsistent focus. This avoids wasting resources following useless lines of reasoning. The nodes (and at a finer granularity, the functional blocks) are connected by clauses reflecting the dependencies between all propositions. The deduction performed is a form of unit clause resolution.

Trouble Shooting Assistant Agent

The Trouble shooting assistant Agent 30 interacts with the human repair engineer 21 to correct the faulty functional blocks that are verified by the diagnosis agent 28 to be faulty. The Trouble shooting assistant Agent 30:

Provides on-line assistance on trouble shooting steps to take;

Enables the repair engineer to report observations that are not directly obtainable by the SFM system;

Reacts to such observations accordingly;

Advises the repair engineer to perform tests to verify that the repair is successful and the symptom is cleared;

Reports any test failures back to the reasoning system; and

Logs the fault specification and isolation (if not yet logged).

The Trouble Shooting Assistant Agent 30 takes as input:

One or several faulty functional blocks to be corrected; and

Repair knowledge stored in the model.

For the known faults for which a trouble shooting method exits, the activity of the Trouble Shooting agent 30 consists, first, of devising a plan of trouble shooting steps and controlling flow between these steps. This forms the trouble shooting scenario and may be in the form of a state transition diagram. The trouble shooting plan is then executed by interpreting the generated scenario. When instructions need to be given to the trouble shooting engineer 21 or questions are to be asked, they are passed onto the Human Computer Interface (HCI) 22. When data is required from other agents of the SFM system, or information is available as a result of performing the trouble shooting that would be useful to its activity, the Trouble Shooting assistant agent 30 interacts with the Coordinator Super-Agent 23 to handle the inter-agents communication. This is necessary, for example, in situations such as when a trouble shooting test fails, and the diagnosis agent 28 must be informed that its diagnosis is wrong.

Modeling and Model-Based Reasoning

Telecommunication networks can be viewed and modeled at any level of granularity, from the circuit level to the level of complete networks. This also applies to the software part of mobile switching systems as these can be modeled from the functional unit level to the level of a complete cellular switch. However, to cope with the complexity of mobile networks and switching/control software, modeling must start at the highest possible level. In the scope of the SFM system 10, the modeling preferably does not go below the functional block level. That means that by its very nature the modeling of the cellular switching system is an abstraction process and is started at the highest possible level of abstraction. From this modeling at high levels a lot of the other specific modeling features arise, like hierarchical modeling or dynamic behavior.

Classical model-based reasoning concentrates more on physical hardware entities like electronic circuits, printed boards, etc. However, in terms of development efforts, only a minor part of current telecommunication systems is hardware. The larger part, and the part causing the hardest management problems, is software. Therefore software modules, services, subscribers etc. need to be modeled.

Telecommunication systems—hardware as well as software—and the already existing management functions are designed and implemented in a hierarchical way in order to cope with their complexity. Therefore the modeling also has to follow this hierarchical approach. This allows for different viewpoints on the model (a "zooming in" on area of interest) and has effects on the inference agents and those browsing the Knowledge Base 38.

Management information for telecommunication systems is not always found at one single—logical or physical—location. Normally, the management of a large network is distributed over various managers which manage (arbitrary) parts of the network. This means that the model of the overall network is cut into pieces and stored at different managers. In the area of SFM, several SFM systems may cooperate, with each one being responsible for a different part of the overall model. Whenever managers need information beyond their model knowledge, they ask higher level managers which in turn have the right to request information from all subordinate managers. With the cooperation and the necessary interfaces between the model parts, boundaries between management domains are introduced at arbitrary positions in the overall model The models are at a high level of abstraction, therefore the behavior is not as static as the behavior of low-level entities. The behavior of a network element may depend on the status of the environment, on administrative actions put on it, or on a specific internal status. This means that the modeling must allow the formulation of conditional statements which enable different types of reasoning according to the current status, or must even allow the modeling of behavior which is specific to only one instance. Such behavior modeling allows formulation of the different kinds of behavior entities that can exist at different times: normal and fault behavior, test behavior, behavior in active or standby mode, behavior dependent on a specific configuration or service logic, etc.

Information for the architecture implementation of telecommunication systems is generally available in the form of technical specifications and documents. In general, since a lot of effort is put into conformance to standards, there is already a good deal of generic knowledge which need not be acquired each time. Only the specifics of each telecommunication application that are unique must be acquired. Therefore the SFM system not only contains the SFM procedures, but also includes the generic portion of the Knowledge Base 38. A crucial problem is the consistency between the real world and the Knowledge Base 38. Not only does the status of some functional entities change frequently, but also the configuration of the mobile telecommunication network 15 (which has to be mapped to the structural model) has a dynamic aspect. These changes can be caused by faults as well as by administrative actions of various kinds. The SFM system 10 solves this problem by utilizing the I-MMB 36 as a single point where all the management-relevant information passes through.

The manner in which the mobile cellular network 15 is modeled has consequences on the reasoning mechanisms. Since the models are structured in a hierarchical mauler, the reasoning must make use of it. Since the reasoning changes back and forth between different granularity levels, there is an advantage to focusing the search for a fault reason. If, for example, a symptom occurs on a low level functional entity, the reasoning goes upwards to higher levels, searches there until it has found the higher-level element in which the cause of the fault is located and then "zooms in" to the detailed modeling of this element. This allows detailed statements to be made without having to do an inefficient and perhaps ineffective search on a wide range at a low level of granularity. Symptoms appearing on a more abstract level (for example, from another part of the TMN, regarding reports on performance decreases in an entire mobile switching system) can then be explained with detailed causes (faults in a specific functional block). This approach is flexible in that the reasoning process goes up and down the hierarchy levels whenever this is indicated by the behavior rules. This is feasible because the subfunction and super-function links between the levels can be represented as aggregation and/or connectivity relations; therefore specialized behavior rules can make use of them.

The SFM system 10 of the present invention combines model-based reasoning with a reasoning process which utilizes experiential knowledge. Case-based reasoning and machine learning approaches may be utilized for this purpose. Based on event logs and history files such techniques are integrated with model-based reasoning and improve the efficiency of model-based reasoning and expand the range of explanations.

Management tasks are growing more complex in mobile telecomunications networks due to trends such as the integration of a large number of different types of wired and wireless resources, and can no longer be handled with the classical techniques. The present invention utilizes model-based reasoning techniques along with a distributed intelligent multi-agents architecture to address these challenges.

There are two main benefits of model-based reasoning: the power and clarity of the knowledge representation and its common usability. First, the Knowledge Base 38 provides a powerful, yet very clear, declarative and easy-to-understand representation of the management knowledge. This is especially important for the following reasons:

Mobile cellular networks are usually quite large. To represent this large amount of complex knowledge a representation form is necessary which combines power with clarity. This is achieved by building models which correspond directly in an intuitive way to the real world units. The importance of clarity and simplicity of the representation cannot be overestimated, as this knowledge must be maintained and worked on by human operators.

Mobile cellular networks are often installed in variants of a given basic system (e.g., a family of switching systems). Modeling of these variants is straight forward when utilizing a deep model-based approach and with the strict distinction between generic and specific knowledge. This is also true for changes to the system.

The second benefit of model-based reasoning is that it is a common approach which can be applied to several different management areas. The SFM system focuses on the specification and isolation of software faults and implements model-based reasoning in the SFM area. Through cooperation with other OSS products in the TMN area, this technique is also utilized for other management tasks like configuration and performance management. The following advantages can be highlighted:

- The I-MIB 36 is a single information base which always reflects the current state of the telecommunication network, and is accessible to all parts of management. The unification of the management functions starts with the common knowledge representation.
- The deep Knowledge Base 38 makes the SFM system robust enough to handle faults and events which are not explicitly foreseen.
- A simulation capability can be implemented with model reasoning, providing the capability to run certain scenarios with all management aspects included.
- The Knowledge Base 38, for the most part, is constructed automatically from design data, etc. which are available in a formalized electronic or paper format.

To date, model-based reasoning systems have been defined for and applied mostly to hardware resources (network equipment) as logical resources. Most software entities in switching systems do not act as managed objects as they do not include the necessary management hooks and do not provide a management interface. Therefore, the managed software entities are represented in the I-MIB 36 by adapting the standard managed object concept so as to reflect their functional and management specifics (software entity functionality, version, state attributes, working versus non-working behavior, interactions with other software/hardware entities, and others).

The managed objects are classified according to the different types of network resources they are representing. The standards bodies managed objects and model-based reasoning are combined. In this perspective, the instances in the structural model are implemented as managed objects, communicating with the switching system software resources and management application functions via actions and events. The models are built by adapting the generic class hierarchy.

As discussed previously, an important aspect of the SFM system architecture is the human/computer interface 22. The SFM system 10 utilizes a powerful and friendly Graphical User Interface (GUI) implemented using currently leading edge technologies which are relevant to management user interfaces. The GUI provides a representation of the managed resources and their state, and gives the user access to control the managed system by launching the SFM functions, setting up the knowledge model, and updating knowledge and data.

These basic needs are satisfied while taking into account the human factor in terms of profile, behavior and interaction suitable for the maintenance task. Interaction focuses on task analysis and the design of the human-computer dialogue and concerns itself with human aspects such as cognitive issues, mental models, metaphors, usability, and so on. The most general user-interaction model in use today (e.g., in windowing systems) is the object-action paradigm by which a user selects an object to act on and then chooses the action to perform.

Another important aspect of the GUI concerns the user interface platform, that is the software and hardware that make "interaction" possible. The design of the GUI takes into account technology issues such as tools, techniques and methods, standards, performance, reliability, security, and so on. The design and implementation of the GUI may also be based on intelligent user interface agents which are task-specific expert systems. An example is an agent that sifts through event logs, searching for patterns, and drawing inferences.

The major functional agents that make up the GUI platform 22 generally fall into three classes: views, dialogues, and roles integration. The views presentation agent class is responsible for generating map views and presenting objects and the relationships among them. The dialog presentation agent class is used to create and present dialog boxes, tables, charts, and graphs as directed on demand, to present object data and to query for user input. The roles integration agent class is used to formulate management roles with specific responsibilities out of applications, tools, and security policies. The instances of these GUI agent classes interact with each other, with the graphics technology used by the GUI, and with the SFM system integrated under the GUI.

The SFM system 10 thus supports two parts of the system management process: fault specification and fault isolation. The SFM system also helps in fault detection. Fault specification includes trouble shooting, fault definition (definition, description, slogan, measures), fault identification, data collection, search for known faults, and identification of possible technical solutions(s). The data collection may be collection of exchange data, restart data, log files, printout alarms, event logs, etc. The result of fault specification identifies the suspected faulty product(s) and the product(s) expert(s), the severity and, if applicable, the identity of the linked known fault and the technical solution.

In situations where a fault is serious, and stopping the effects of the fault or preventing the fault from recurring would cause adverse effects (for example cyclic restarts), emergency corrections are written. For known faults and similar scenarios, if an emergency correction is applicable, an option to execute the emergency correction can be made available.

Knowledge-based systems (KBS) technology plays an integral role in tasks such as performance monitoring, diagnosis and prediction, and in the planning and scheduling of maintenance activities. The SFM system of the present invention is primarily concerned with diagnosis. A diagnosis may be defined as a list of malfunctions associated with the components of a system that is consistent with the observed behavior of the system.

In their simplest form, KBS systems for diagnosis rely on a technique known as heuristic classification in which empirical relationships defined by a human expert are used for matching symptoms and diagnostic conclusions. A "close-world" assumption may further reduce the complexity of the task by fixing the solution space to a predefined set of diagnostics. On the other hand, the complexity of diagnostic problem-solving increases as uncertainty is introduced, when there is a requirement for multiple fault diagnoses; when failures are manifested intermittently, or when temporal reasoning is necessary. Finally, when a reasoning strategy is based on first principles, a model-based approach using qualitative physics techniques introduces yet another level of complexity to diagnostic problem-solving.

As an instance of the abduction class of problems in knowledge-based technology, diagnosis can be characterized as finding the best explanation for a set of data. The data refers to observations, measurements or test results, while a list of malfunctions or failure-modes associate with the various components of a system, entailing the observations, defines the explanation. In this framework, a model of the system typically enumerates the possible failure-modes of each component and associates these with conclusive symptoms. Since symptoms refer to both observations and other disorders, knowledge of the causality underlying the failure behavior of the target application must be as complete as possible.

In many cases uncertainty principles are used to compute the most likely, believable, probable, possible, or plausible diagnostic given the respective models of evidence accumulation and a priori ranking of failure-modes. Often in probabilistic models, assumptions are made regarding conditionally independence of symptoms and the mutual exclusiveness of disorders.

Model-based diagnosis operates on qualitative formulations of device behavioral models derived from first principles. The first phase in this approach consists of identifying the faulty components that explain the observed symptoms. This procedure entails a qualitative simulation of the device behavior. In general, many candidate diagnoses are generated that explain the observed behavior of the device. The set of possible diagnoses is almost always combinatoral, especially for complex applications. To reduce the computational complexity of candidate generation, assumptions may be made regarding the number of faults possible in a system or component, or the behavior models may be simplified. Other restrictions are placed on the size of possible candidate solutions.

The troubleshooting process for a telecommunication system is very complex. Troubles do not necessarily stem from software faults. They may result from an incorrectly configured switch, from a hardware problem, from the wrong perception of the functionality of a cellular switch component, or even from the limitations of cellular switch technology. In addition, the mapping of the causal path between manifestations or troubles and a software fault is not obvious. Finally, a software fault may manifest itself in different ways under different operating conditions.

Given that a software fault is determined to be responsible for a problem being experienced, it must be located and specified. The complexity of fault specification depends on the type of fault (e.g., design faults, specification faults, programming and logic faults, or syntax faults). The complexity of correction design also depends on the type of software fault. Syntax software faults may be easily corrected by troubleshooting personnel, however correcting design and specification faults requires design knowledge since a correction may impact other software blocks and consequently, functionality.

The use of lie mobile network's Operations Support System (OSS) is a key factor for the SFM system of the present invention. It provides direct access to the switch management data and provides a system that is more proactive and that can foresee system degradation. Faults in a telecomunications switching system often do not immediately result in catastrophic failure. More frequently, faults become manifest in minor externally observable failures, such as a missing dial tone or a dropped call, or internal errors such as a steady decline in resource availability, whose cumulative effect may result in severe failure. It is during this period that the system proactively reports the problem before a severe failure occurs.

These system capabilities are achieved by automatically acquiring network and traffic data from the switches, storing the data and presenting value-added information via the GUI 22 to trouble shooters and engineers 21. Costly equipment down time is reduced by predicting the occurrence of faults before the client perceives trouble, based upon minimal performance criteria for each switch.

Relations between the mobile telecommunications network components at all levels (i.e., service, network, network element, network element subsystems, or software blocks) are relevant for the faults management process. They provide a basis for the fault pattern and propagation recognition They are also usefull when correlating alarms. They can be used to guide further diagnostic testing and measurement activities. Results analysis and fault localization can also be based on the information collected on the interactions between physical network components and the signal exchanged between software elements.

In previous sections, the aggregation relation and inheritance relations between generic classes have been discussed. From the network management perspective, two other relationships are relevant: the connectivity relation and the use-of-service relation. They can be modeled as separate managed objects representing relations mapped on physical or logical interactions between the cellular network elements described in the previous sections.

Connectivity: In the case of a mobile telecommunications network, at least two types of connectivity can be defined: wired and wireless connectivity. For example, a connection between Mobile Switching Centers (MSCs) and Base Stations (BSs) may be realized via a physical wired connection to the Base Station Controller (BSC). Wireless connectivity relates to the air interface connection between a Mobile Station (MS) and a Base Station Transceiver (BST). At a lower level (i.e., functional block and unit level), a specific type of connectivity is identified as a communication relation.

Figure 3:
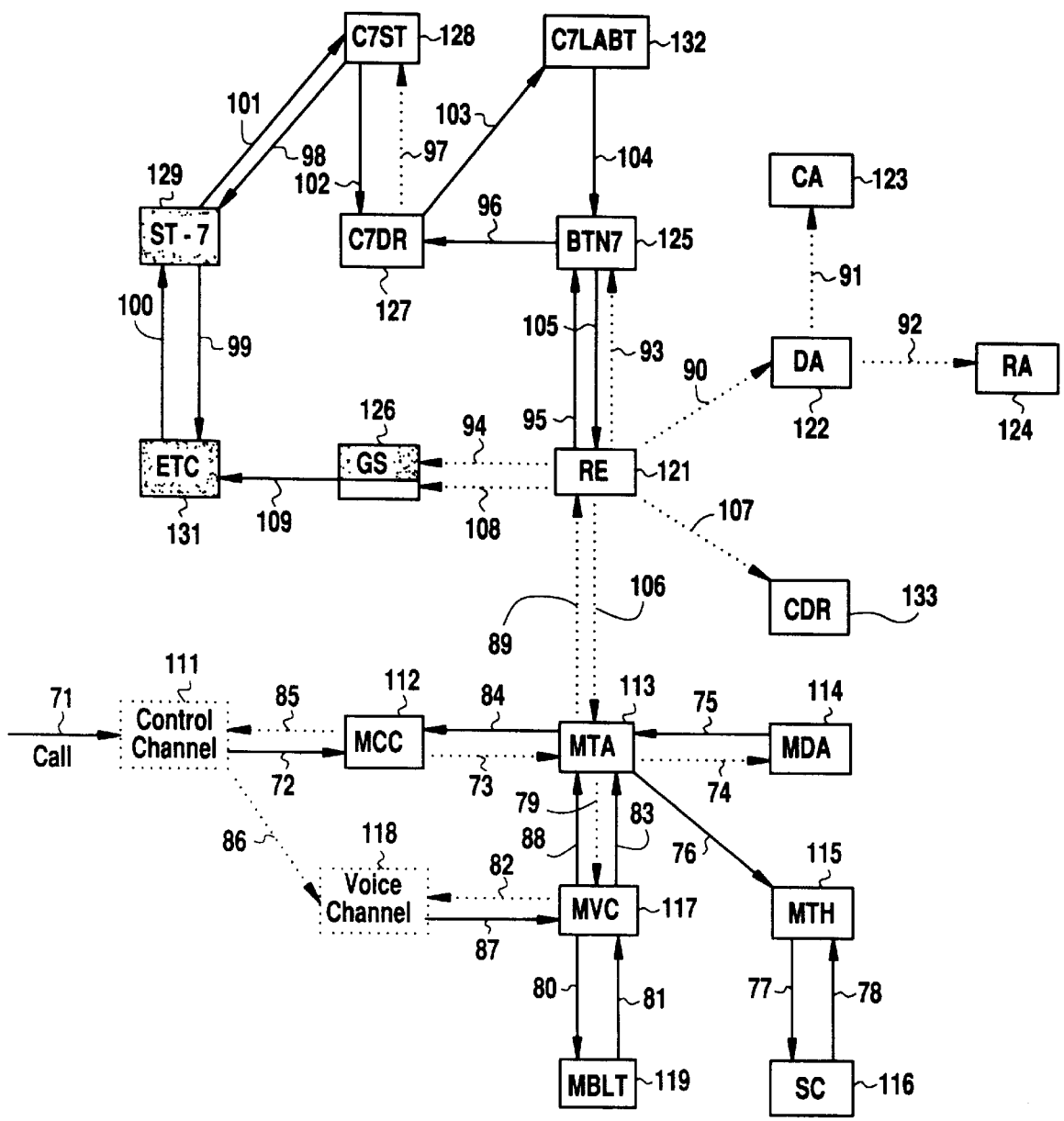
FIG. 3 is an integrated functional block interactions diagram illustrating the functional block interactions in a call setup from a mobile station to another subscriber in a radio telecommunications network.

FIG. 3 is an integrated functional block interactions diagram illustrating the functional block interactions in a call setup from a mobile station to another subscriber in a radio telecommunications network. In FIG. 3, a detailed description of the processing of the call is given. From this description several specific relations between software blocks involved in the processing of the call from one end to the other are identified. The communication relations are the signal exchanges between software blocks that represent the message exchanged (e.g., access message, Mobile Station Number, record number, etc.).

Use-of-Service: From the user perspective, this relation ties a customer or a user to a given service provisioning point or a managed-element service-access interface. From the managed element perspective, the use-of-service relation is defined as (1) between two or more equipment/software blocks within a managed element, or within different managed elements, or (2) between a software block and an equipment within a managed element. The description of FIG. 3 also provides several instances of use-of-service relation class that can be identified at a functional blocks level during a call provisioning (e.g., coordination of call set-up, Mobile Station number analysis, voice channel allocation, transmission control, etc.).

At step 71, an access message is received for a call on the control channel unit 111 of the current cell. At step 72, the control channel unit sends a communication interaction to a Mobile Telephone Control Channel (MCC) software block 112 where the content of the access message (i.e., calling party mobile station number, serial number, and the dialed number) are stored in the MCC-record associated with the control channel unit. At step 73, the MCC 112 sends a service interaction to a Mobile Telephone Analysis (MTA) software block 113 ordering the MTA to select an idle MTA-record for storing the access message content. At step 74, the MTA 113 sends a service interaction to a Mobile Telephone Digit Analysis (MDA) software block 114 requesting the MDA to analyze the calling party's mobile station number. A response is returned to the MTA 113 in a communication interaction at step 75. If the calling party mobile station number has been specified in the serving MSC as an "own" number, then the MTA points out the corresponding subscriber record in the software block Mobile Telephone Home Subscriber (MTH) 115 at step 76.

At steps 77 and 78, the corresponding subscriber record in MTH 115 is linked to the subscriber record in a Subscriber Categories (SC) software block 116. At step 79, the MTA 113 sends a service interaction to a Mobile Telephone Voice Channels (MVC) software block 117 to seize an idle voice channel unit 118 in the current cell. At steps 80 and 81, the MVC 117 is linked to a Mobile Telephone Base Station Line Terminal (MBLT) record 119 corresponding to the seized voice channel unit 118. At step 82, the MVC 117 sends a service interaction to the voice channel unit ordering the unit to start the unit's transmitter. At steps 83 and 84, the MVC then provides the MCC 112 (via the MTA 113) with the channel number on which the selected voice channel operates. At step 85, the MCC sends a service interaction to the control channel unit 111 to send a voice channel designation message to the calling subscriber.

At step 86, the control channel unit 111 orders the voice channel unit 118 to busy-mark the calling subscriber. At 87 and 88, the voice channel unit then informs the WTA 113 (via the MVC 117) that the mobile station has tuned to the voice channel unit. At step 89, the MTA requests the Register Function (RE) 121 to seize a record. The MTA provides the RE with the dialed digits. At step 90, the dialed digits are sent, one by one, to a Digit Analysis (DA) software block 122. At step 91, the DA interacts with a Charging Analysis (CA) software block 123 to determine how the call is to be charged. At 92, the DA interacts with a Route Analysis (RA) software block 124 to find a route. The RE 121 then sends a service interaction at 93 to a Both-way Trunk (BTN7) 125 to select and report a free outgoing PCM channel in the route previously calculated by RA 124.

The RE 121 then requests, at 94, a Group Switch (GS) hardware and software block 126 to reserve a path from the MBLT voice line to the BTN7 PCM channel. At 95, the RE 121 sends the dialed digits to BTN7 125 which forwards them at 96 to a CCITT No. 7 Distribution and Routing (C7DR) software block 127, mid includes information about their destination. After examining the destination information, the C7DR interacts with a CCITT No. 7 Signaling Terminal (C7ST) administrative software block 128 at 97 to select the proper signaling terminal (ST-7) 129 for sending the message. At steps 98 and 99, the digits are sent from the C7ST 128 to the calling party's Exchange Terminal Circuit (ETC) 131 (via ST-7 129) where they are sent to the called party's ETC (not shown).

The called party's ETC then informs the calling party's ETC 131 that the called party is available and setup is permitted. At steps 100 and 101, a message to this effect is sent from the calling party's ETC 131 to the C7ST 128 via the ST-7 129. The C7ST forwards the message to the C7DR 127 at 102 to determine whether the message is addressed to the calling party's ETC 131. If so, the message is sent to a CCITT No. 7 Label Translation (C7LABT) 132 at 103 to identify the BTN7 channel. The message is then sent to BTN7 125 at 104 and the proper RE 121 at 105. The RE notifies the MTA 113 of the call status at 106 and orders selection of a Charging Data Record (CDR) 133 at 107. At 108, the RE 121 orders the GS 126 to set up the path previously reserved which is performed at 109.

At this point, the RE has completed its tasks, and a call supervision record is selected to supervise the call. The calling party MSC is then through-connected to the called exchange, and the calling party receives a ringing control tone from the called exchange. When the called party answers, the two parties can converse.

Figure 4:
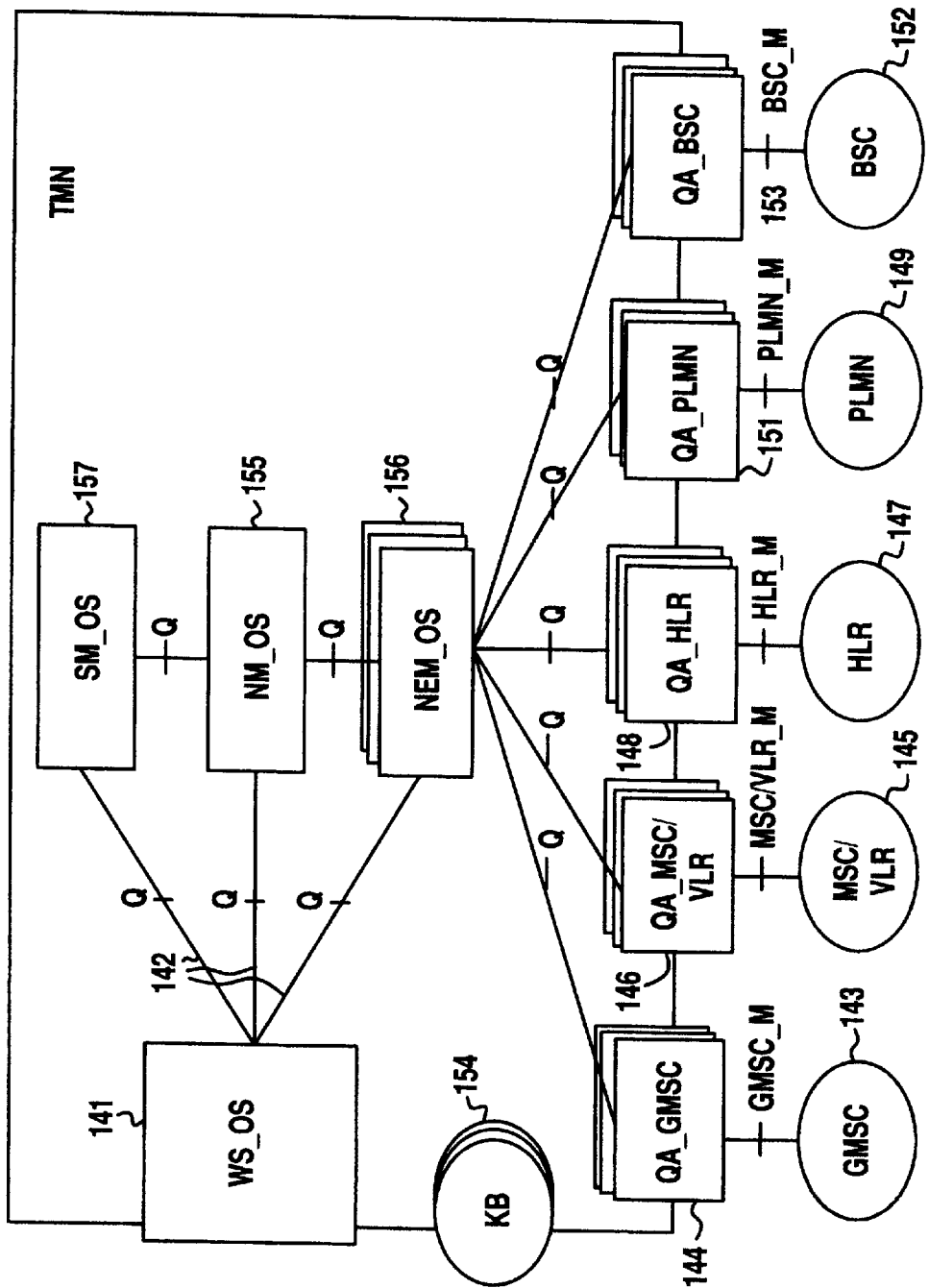
FIG. 4 is a block diagram of a physical architecture compliant with Telecomnunications Management Network (TMN) standards in the preferred embodiment of the SFM system of the present invention.

FIG. 4 is a block diagram of a physical architecture in the preferred embodiment of the SFM system 10 of the present invention. The architecture is compliant with Telecommunication Management Network (TMN) principles and framework. There are four logical layers of the TMN architecture: Service Management, Network Management, Network Element Management, and Network Element Layer. A block is considered to be physical when it is implemented on independent physical equipment, and it communicates with other blocks through TMN interfaces. For this reason, most of the network elements are presented as single physical blocks. Internally, they are made of several independent functional blocks which may be distributed on different equipment.

FIG. 4 utilizes, where relevant, M.3010 (ITU 95) terminology for building blocks and standard inter-operable interfaces. It should be noted that there is no "F" interface. A Work Station Operations System (WS_OS) 141 contains OS functions which enable it to communicate with other blocks via a "Q" interface 142. Within the work station, there is a "f" reference point between the OS functions and the WS functions. Additionally, there is no Mediation Device (MD) explicitly shown in order to simplify the resulting architecture. Some functionality classified as belonging to OS entities may be considered as part of mediation functions, since M.3010 states that mediation function blocks may store, adapt, filter, threshold and condense information. As a consequence, there is no "Qx" interface, all "Q" interfaces being "Q3" interfaces.

Conversely, several different "M" interfaces are explicitly identified since they belong to different equipment. These are:

GMSC_M between a Gateway Mobile Switching Center (GMSC) 143 and a QA_GMSC 144;

MSC/VLR_M between a Mobile Switching Center/Visitor Location Register (MSC/VLR) 145 and a QA_MSC/VLR 146;

HLR_M between a Home Location Register (HLR) 147 and a QA_HLR 148;

PLMN_M between a Public Land Mobile Network (PLMN) 149 and a QA_PLMN 151; and

BSC_M between a Base Station Controller (BSC) 152 and a QA_BSC 153. Communication functions which are not TMN function blocks are not shown.

Knowledge Bases (KBs) 154 are Information & Knowledge Bases used, for example, for logging information about detected faults or for accessing information about known faults in the system. In the present invention, these are utilized by any CMIP agent or manager via specific interfaces and access protocols, depending upon which KB is to be accessed. The information model used to exchange data between the physical blocks of the SFM system may be explained through an example of monitoring. The SFM system performs an application function referred to as "Proactive Monitoring". This mainly consists of collecting data from cellular network elements and processing them at various levels, to generate information at the uppermost level. The types of data collected include:

Implementations of time averaged measurements such as traffic rates, resource utilization, etc.;

Overall sub-network or network statistics such as ratios, probabilities, etc.;

Inventory of network components (topology, interconnectivity and internal characteristics); and Alarms when thresholds are reached or tide mark changes.

To enable information exchanges inside the SFM system, appropriate information models are shared (i.e., shared management knowledge). This information consists of the MIB models generated by several appropriate implementations of GDMO templates (it is not the instances of the MOs themselves, but the classes which are shared), as well as the knowledge base models such as the fault scenarios, the known faults repository, and the corresponding corrective procedures. The latter information is accessed through specific protocols depending on the nature of the existing support data and/or knowledge bases. In this perspective, the knowledge of the involved KB models must be shared by most of the physical architecture blocks.

For the previous example of monitoring application functions, the following basic information flows can be identified at the Q interfaces between the Network Management (NM) layer, the Network Element Management (NEM) layer, and the managed Network Elements. At the Q Interface at the Network Management Level, the CMIS control and information request PDUs to:

Get calculated network-wide measurements;

Get information about the configuration of the network;

Set the threshold for alarms; and

Create or delete managed object instances, etc.

The CMIS responds with errors and notifications consistent with the incoming requests and the internal status of the network. The WS_OS block 141 and the Network Management Operations System (NM_OS) block 155 share the knowledge of the NM-MIB_MODEL.

At the Q Interface at the Network Element Management Level, the CMIS control and information requests PDUs to:

Get the value of the counters of each network element;

Get calculated measurements for the network elements;

Get information about the configuration of the network elements;

Set alarm thresholds;

Poll the NE to check the threshold, and

Create or delete managed object instances, etc.

These control and information requests may be originated from the NM_OS block 155 or the WS_OS block 141. The CMIS responds with errors and notifications consistent with the incoming requests and the internal status of each network element. The knowledge of the NEM_MIB Model is shared by the WS_OS block 141, the NM_OS block 155, and the Network Element Management Operations System (NEM_OS) blocks 156.

The physical blocks of the SFM system of FIG. 4 process data associated with managed objects pertaining to specific MIBs, and exchange this information between the blocks. The proactive monitoring application functions are also used here for illustration purposes. The following are examples of functions associated with some of the involved blocks.

The NEM_OS block 156 is the TMN layer that is closest to the network elements and acts as a measurement probe forwarding, if necessary, calculated values to the upper layers. The processing involved in this component is network element specific. Only information about that element is processed at this layer. Examples of the functions performed are:

Data collection: the Network Element (NE) data is gathered, and it is either further processed or simply logged;

NE measurements and statistics: the gathered raw data is converted to more logical forms (e.g. counters to rates); and Logging of the data: the data are stored for later use;

The NM_OS block 155 is in charge of management functions that cannot be performed by the NEM_OS 156. The NM_OS aggregates the results of the NEM_OS and calculates network wide parameters. The inventory of network elements is an example of a function performed at this level. Examples of network wide measurements and statistics that are computed at this level include:

Instantaneous or time averaged measurements, e.g. traffic rates, resource utilization, etc.;

Overall sub-network or network statistics, e.g. ratios, probabilities, etc.;

Inventory of the network components (topology, interconnectivity and internal characteristics); and Alarms when thresholds are reached or tide mark changes.

The Service Management Operations System (SM_OS) 157 is the TMN layer that is in charge of management functions from a service perspective. End-to-end service functions from service operation, maintenance, and provisioning are handled by the SM_OS 157.

The WS_OS block 141 handles the HCI (Human/Computer Interface) 22 (FIG. 1) and presents the information (measurements of utilization, statistics on errors, inventory, alarms, etc.) on a graphical display to the user. The user may directly access the managed objects handled by the NM_OS block 155 or the multiple NEM_OS blocks 156. The WS_OS is also responsible for helping the user in the process of selecting control parameters. In addition, a browsing capability enables the user to trigger inventory functions throughout the network.

For the SFM system, there are two main interface components: a switch interface, and the "Q" interface. The switch interfaces may be proprietary to each equipment manufacturer, and are realized through appropriate messages according to the specific OSS implementation. Switch-specific QA blocks convert protocol operations and data from CMIP to machine language for the particular switch in the network and vice versa. The following paragraphs show some of these messages.

From QAF To Switch. In the proactive monitoring application, two types of CMIS message are translated to appropriate switch messages: GET and SET. If scooping and filtering are being used, the appropriate number of switch messages are forwarded to the switching system. The TMN observes the QAF objects' attributes by polling them.

From Switch To QAF. The messages coming from the switch to QAF can be divided into 3 categories:

Result Message: messages containing the results of a GET action;

Confirm Message: confirmation of a SET action; and

Indication Message: indications coming from the switch (e.g., Call-Rejection-Indication). These indications result in notifications from the QAF objects.

Switch Q Interface. The Q interface functional module allows the exchange of CMIP requests, responses, errors, and notifications between a manager and an agent. A High level O-O interface on the manager side is an API offering a high degree of abstraction over the "raw" API implementing CMIP. This is provided in OSS through the use of the IDL language within a CORBA-compliant support platform. On the agent side, a generic agent API performs an equivalent task.

The data exchanged within the CMIP PDUs depend on the actual MIB model shared by the manager and the agent.

The CMIP-Agent contains two sub-functions: the agent function and the MIB function. The agent function is responsible for sending and receiving messages and for access control. Incoming requests are validated and forwarded to the MIB function. After the MIB function responds with the requested information (a confirmation or an error message), the agent function constructs a CMIP message to send to the requester.

The MIB function receives requests for setting and getting managed objects. These abstract objects are identified by a unique object identifier defined in a naming tree. The MIB function accesses the instance (variable) corresponding to the abstract object. The MIB function also initiates traps for generating alarms.

The Network's Operation and Support Subsystem (OSS)

A three-layered architecture may be utilized within the network's Operation and Support Subsystem (OSS): a presentation layer, a service layer, and an information layer. The presentation layer implements the Graphical User Interface (GUI). The GUI utilizes services offered in the F and Q3 interfaces. For performance presentation needs, a Cellular Network Performance Report (CNPR) utilizes an SQL interface to access performance data from a relational database Cellular Network Performance Database (CNPDB). This is due to the current limitation of the CORBA implementation of Q3 and F interfaces to support large quantities of data. Application Units proposed for implementation in this layer are: an alpha numeric graphical user interface for configuration and performance (ACD); a graphical user interface for the geographical display of the cellular Network to allow performance and configuration management (GCD); an alpha numerical graphical user interface displaying the running and scheduling activities the cellular and the management network (CNAM); and a number of predefined performance reports making use of information retrieved from the CNPDB (CNPR).

The service layer defines a number of network management services provided by OSS to it's users. The service layer is based on ITU-T recommendation M.3000 (ITU 94) which defines five management functions: Configuration Management, Performance Management, Network Management, Activity Management, and Channel Tester Reporting. Configuration Management addresses three aspects: work area (hold modified network configuration in temporary buffer, provide Q-adapters interface, etc.); consistency check report (verify consistency between MO parameter values based on rules defined in Q-adaptor); and Activity Manager (manages OSS activities, initiate scheduled activities, allow user to manage his activities, report activity status). Performance Management involves mainly: the scheduling of measurement program (schedule, initiation, termination, etc.); the retrieval of data (data transferred to OSS through MSC printout and stored in QSL performance database); the management of data (manual and automatic compression and deletion); the reporting of graphics report for QoS improvement, fault trouble shooting, network planning, etc.

The information layer provides an Open Interface toward Network Element. A Q3 interface based on CORBA is implemented for this purpose. The interface provides CMISE-IDL that allows access to the CMISE service primitives. Q-Adaptor (QA) is developed to provide the open interface by accessing the NE via proprietary machine language interfaces. QA-MTS defines the Q3 interface between the mobile network element resources and the cellular part (MTS: Mobile Telephony Subsystem) of an MSC. PLMN MIB and MSC MIB are defined to contain MOs representing real resources in the cellular network. They can be accessed via the agents that act on them (PLMN Access and MSC Access).

Reactive and Proactive Management

As discussed above, the SFM system utilizes two modes of operation for SFM activity, reactive management and proactive management. Reactive management is utilized upon detection of events or arrival of alarm notifications from managed resources (e.g., the mobile switching system), or upon reception of user complaints (Trouble Reports issued by customers, etc.). Proactive management is utilized to anticipate and prevent fault occurrences.

Reactive Management

The reactive SFM process is used to handle troubles after they occur in the system (i.e., their effects have been already observed). Based on the collected information about the trouble, the defined SFM agents cooperate together in order to identify the fault type, locate the faulty software component, and perform corrections if available. For well known faults, a trouble shooting method normally exists. For unknown faults, the reactive SFM process assists the engineer during the trouble shooting by providing access to relevant information and tools.

Figure 5:
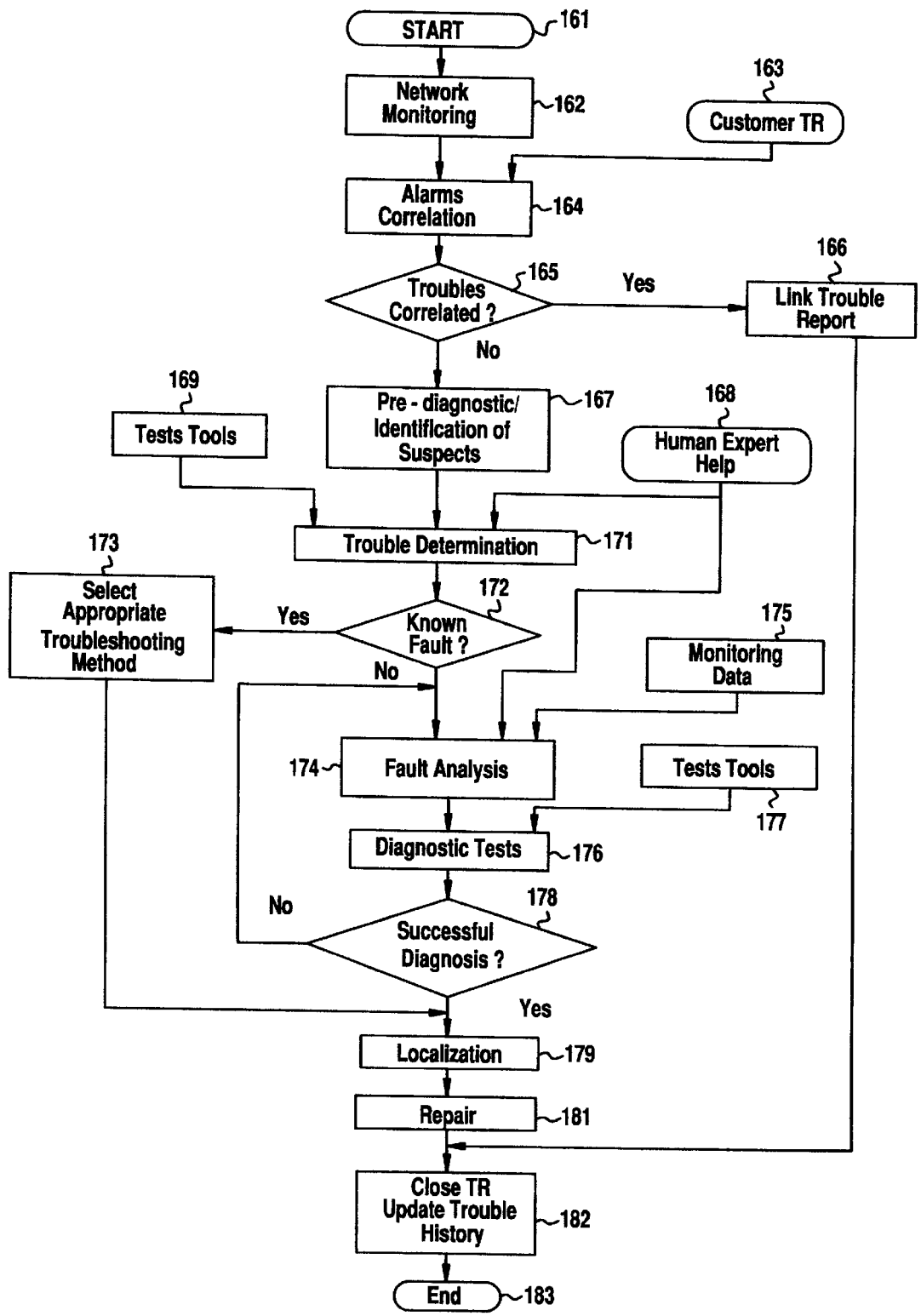
FIG. 5 is a flow chart illustrating the steps involved in performing the trouble diagnostic process in the reactive mode.

FIG. 5 is a flow chart illustrating the steps involved in performing the trouble diagnostic process in the reactive mode. In the figure scenario, it assumed that the trouble condition already exists in the network. The process starts at step 161 and continues network monitoring at 162. An indication of the trouble condition is then received, either as a trouble report from the customer at 163 or an alarm generated by the network monitoring at 162. This invokes the SFM reactive mode. Based on the collected information on the failure situation (customer trouble complaints, monitoring data, performance data, and statistics) and the knowledge of the involved managed system model, the system performs filtering and correlation procedures at step 164. These procedures attempt, for example, to identify the root alarm by discarding side effects and redundant alarms if any.

At step 165, it is determined whether or not the trouble report can be linked to another reported problem already in process (i.e., the newly reported problem is only a side effect of a previously reported problem). If so, the process moves to step 166 and links the current trouble report to the existing TR. This is the end of the process for a linked TR, so the process moves to step 182 where the trouble report is closed and historical faults logs are updated. If the trouble reports cannot be linked, the trouble condition is a new one and must be processed accordingly (i.e., creation of a new TR). At step 167, the SFM system analyzes the collected, filtered, and correlated data in order to make diagnostic decisions. Based on the knowledge of the frictional and fault models and scenarios, and supported by the use of the appropriate test procedures by human expert help at 168 and test tools at 169, the fault type is identified and a preliminary list of suspect components is issued at 171. At this point, the suspects are more likely of a higher level in the aggregation tree of network components, for example, a given switch or a given gateway, etc.

At step 172, it is determined whether the suspected fault is a known fault. If the fault is already known, the process moves to step 172 and implements and deploys corresponding corrective actions. However, if the fault is not a known fault, the process moves to step 174 where further fault analysis is performed. Once again, human expert help from step 168 may be utilized as well as additional network monitoring data at 175. Following this analysis, diagnostic tests are performed at 176, and the SFM System may interface various test tools at 177 for this purpose.

At step 178, it is determined whether or not a successful diagnosis was obtained. If not, the process returns to step 174 and repeats the fault analysis step. The fault situation is recursively analyzed at different network abstraction levels (i.e., service level, network level, network element level, the software subsystems at the level of a switch, and finally the functional blocks contained in the selected subsystem). If a successful diagnosis is obtained, the process moves to step 179 and performs the fault localization process. The relationships between the involved components are also analyzed during the fault localization process based on the service logic at the service level, the connectivity between the network elements at the network level, and the aggregation of software systems, subsystems and blocks at the switch level.

The process then moves to step 181 where the SFM system interacts with engineers to assist them in the repair process. The trouble report is then closed and historical faults logs are updated at step 182. The process ends at 183.

Proactive Management

In the proactive mode, the system continually monitors the state and behavior of critical resources in the cellular switching system in order to predict and hence prevent the occurrence of potential faults. For example, based on selected performance data and statistics, the system may recognize a progressive degradation of the Quality of Service (QoS) and take corrective action. The proactive mode is mainly effective for those faults that are well known (e.g., having a precise fault model, being part of well modeled fault scenarios, having intermediate symptoms, etc.). In general, the same diagnostic process described for the reactive mode applies for the proactive mode. When the SFM system determines that a potential fault is likely to occur, additional verifications are performed and preventive measures are taken, if available. If not available, a notification is sent to the system users. In the proactive mode the information collection process continue whether the diagnostic results are successful or not.

Figure 6:
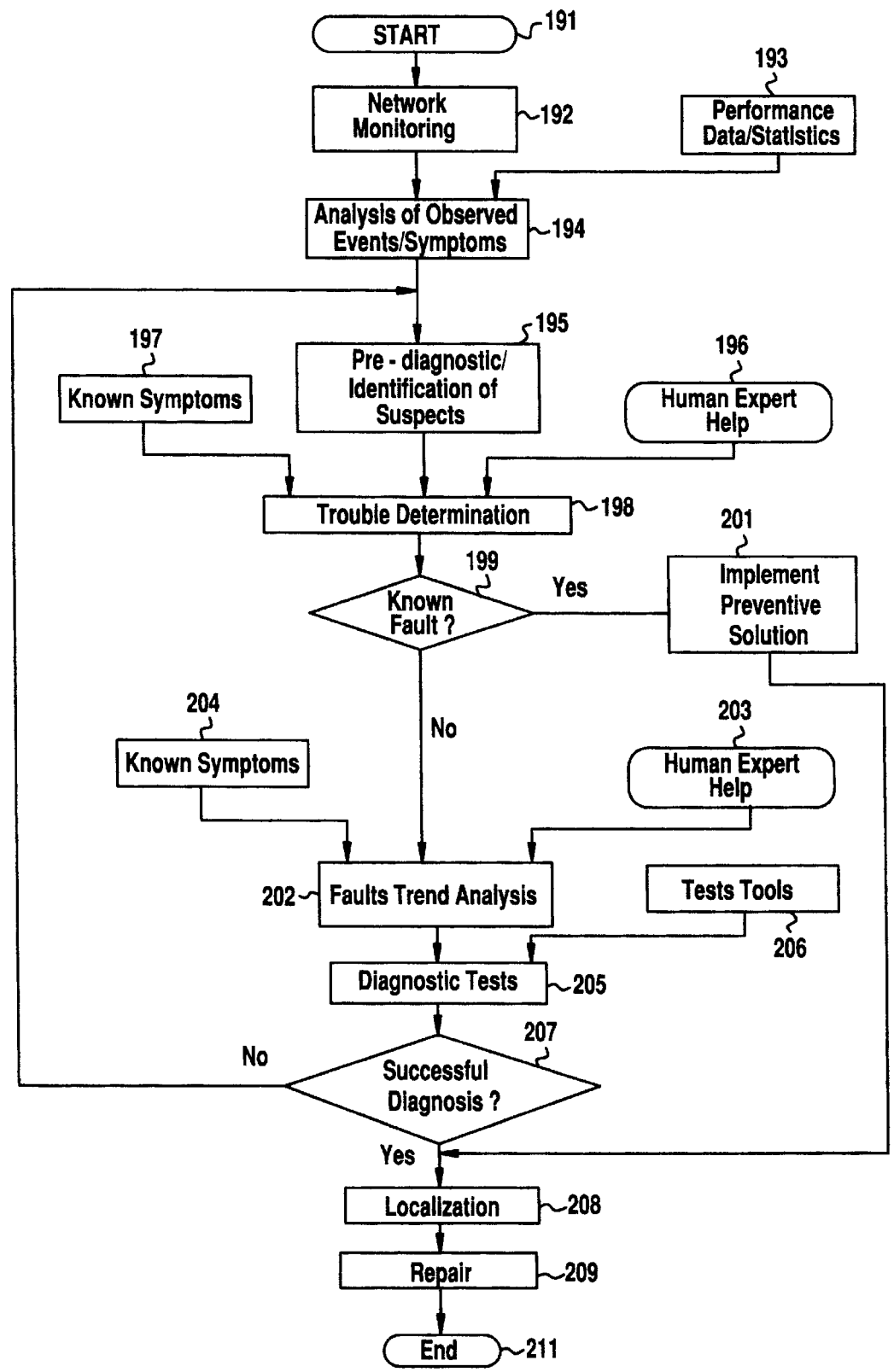
FIG. 6 is a flow chart illustrating the steps involved in performing the trouble diagnostic process in the proactive mode.

FIG. 6 is a flow chart illustrating the steps involved in performing the trouble diagnostic process in the proactive mode. The process starts at step 191 and continues network monitoring at 192. Selected performance data and statistics are received at step 193. At 194, an analysis is performed of the observed events and symptoms reported from the network monitoring step 192. The events and symptoms are analyzed and compared with the performance data and statistics at 194. Based on the knowledge of the functional and fault models and scenarios, and the analysis at step 194, a preliminary list of suspect components is issued at 195. Supported by human expert help at 196, and compared to known symptoms at 197, a trouble determination is made at 198. At this point, the suspects are more likely of a higher level in the aggregation tree of network components.

At step 199, it is determined whether the suspected fault is a known fault. If the fault is already known, the process moves to step 201 and implements a preventive solution. The process then moves to step 208 and proceeds with fault localization and repair activities. However, if the fault is not a known fault, the process moves to step 202 where a fault trend analysis is performed. Once again, human expert help from step 203 may be utilized as well as an input of known symptoms at 204. Following the trend analysis, diagnostic tests are performed at 205, and the SFM System may interface various test tools at 206 for this purpose.

At step 207, it is determined whether or not a successful diagnosis was obtained. If not, the process returns to step 195. If a successful diagnosis is obtained, however, the process moves to step 208 and performs the fault localization process. The relationships between the involved components are also analyzed during the fault localization process based on the service logic at the service level, the connectivity between the network elements at the network level, and the aggregation of software systems, subsystems and blocks at the switch level.

The process then moves to step 209 where the SFM system interacts with engineers to assist them in the repair process. The process ends at 211.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

APPENDIX A

Comments included in the template definition (preceded by --) and text following the template definitions are used to describe the features of the managed object class and how they are built up.
  a) MANAGED OBJECT CLASS DEFINITION
  axeMobileSwitchCenterVisitorLocationReg MANAGED OBJECT CLASS
  DERIVED FROM Axe10NetworkElement;
  CHARACTERIZED BY
  axeMobileSwitchCenterVisitorLocationRegPackage,
  administrativeOperationalStatesPackage,
  softwareUnitPkg PACKAGE
  BEHAVIOUR
  axeMobileSwitchCenterVisitorLocationReg BEHAVIOUR
  DEFINED AS                -- in-line BEHAVIOUR definition
  "The axeMobileSwitchCenterVisitorLocationReg object class is a class of
objects which identifies the mobile switching centers in charge with switching,
signaling, calls, billing and connections (fixed and mobile) activities. MSC is a
telephone exchange which performs mainly call control and switching functions for
Mobile Station within its geographical area. MSC may also provide gateway function
to interface to the PSTN (Public Switched Telephone Network). The VLR is a database
that contains the information about visiting Mobile Station belonging to a foreign
area. In practice, the VLR is integrated within MSC. Therefore, we refer to the MSC
and the VLR as to a composed entity: MSC/VLR. Following are some MSC main

APPENDIX A-continued functions: transmission of signaling and speech between Base Station and MSC, collection and analysis of signal strength measurements, switching of calls to the appropriate BS, interrogation of routing data toward HLR and MSC-Home, updating the MS location information, maintenance of speech path continuity as subscribers move between BSs and between Service Areas".
    ;--End of embedded BEHAVIOUR template
  ;--End of BEHAVIOUR construct
  ATTRIBUTES

| | |
|---|---|
| axeMobileSwitchCenterVisitorLocationRegId | GET, |
| alarmStatus | GET. |
| administrativeState | GET-REPLACE, |
| operationalState | GET, |
| usageState | GET, |
| softwareId | GET SET-BY-CREATE, |
| softwareVersion | GET |
| availabilityStatus | GET |
| proceduralStatus | GET; |

NOTIFICATIONS
    environmentalAlarm,
    equipmentAlarm,
    communicationsAlarm,
    ;;;
  CONDITIONAL PACKAGES
    stateChangeNotificationPackage PRESENT IF
        "the stateChange notification is supported by an instance"
      softwareProcessingErrorAlarmPackage PRESENT IF
        "an instance support it"
    appliedPatchPkg PRESENT IF "an instance supports software patching",
    checkSumPkg PRESENT IF "an instance supports it",
    fileInformationPkg PRESENT IF "an instance supports it",
    filePkg PRESENT IF "an instance supports it",
    informationAutoBackupPkg PRESENT IF "an instance supports it",
    informationAutoRestorePkg PRESENT IF "an instance supports it",
    informationBackupPkg PRESENT IF "an instance supports it",
    informationRestorePkg PRESENT IF "an instance supports it",
    installPkg PRESENT IF "an instance supports it",
    noteFieldPkg PRESENT IF "an instance supports it",
    revertpkg PRESENT IF "an instance supports it",
    terminateValidationPkg PRESENT IF "an instance supports it",
    usageStatePkg PRESENT IF "an instance supports it",
      validationpkg PRESENT ff "an instance supports it";
    REGISTERED AS {axeDescriptionObjectClass 5};

The Managed Object Class template forms the core of the managed object class definition. All other templates are referenced, directly or indirectly, from this template. The body of the template consists of one or more constructs. Each construct has a CONSTRUCT-NAME which identifies the type of construct and may have a construct argument whose structure and meaning is dependent upon the construct type. For example, the DERIVED FROM construct provides the means to specify the superclass from which a managed object class has been derived. The axeMobileSwitchCenterVisitorLocationReg definition gives the overall structure of the managed object class. It is derived directly ftom the definition of Axe10NetworkElement, so it inherits all the characteristics of Axe10NetworkElement as a starting point. For this example, we consider that all instances of this class will be contained within instances of the Axe10NetworkElement. The class has nine attributes, defined as part of ATTRIBUTES construct. The first attribute, axeMobileSwitchCenterVisitorLocationRegId, will be used as the naming attribute for the naming object class.

b) NOTIFICATION DEFINITION
  axeCommunicationError NOTIFICATION
    BEHAVIOUR
    axeCommunicationErrorBehaviour BEHAVIOUR
      DEFINED AS             "The axeCommunicationError notification is generated by the axeMobileSwitchCenterVisitorLocationReg managed object class when a communication error is detected by the managed object in order to alert exchange personnel about the problems within the exchange. The notification includes any combination of the following parameters: Probable Cause, Severity, Trend Indication, Diagnostic Info, Threshold Info, State Change and Order Info, parameters which present information about the exchange name, the date, time, title of alarm, suspected faulty equipment, fault code, fault type and state of the equipment";
    ATTRIBUTES

| | |
|---|---|
| operationalState | GET, |
| alarmState | GET; |

WITH INFORMATION SYNTAX NotificationModule.ErrorInfo;
    WITH REPLAY SYNTAX
NotificationModule.ErrorResult;
  REGISTERED AS {axeCommunicationError5};
    The notification contains information associated with an event that may

APPENDIX A-continued otherwise be lost by maintaining statistics only. It provides a generic mechanism to inform about a communication error. The attributes to be carried are specified by use of Parameters added when the notification is included in a Package.

c) CONDITIONAL PACKAGES

Conditional Packages form a mechanism for defining managed object classes to which additional capabilities may be added under defined circumstances. The use of packages bring more flexibility eliminating the necessity of defining distinct managed object classes for each combination of core plus additional facilities. They permit a collection of attributes, operations, notifications, parameters and behavior to be defined and they may contain elements that augment the specification inherited from the superclass.

```
appliedPatchPkg PACKAGE
    ATTRIBUTES
        appliedpatches GET;
    REGISTERED AS {softwareManagement package(1)
applied PatchPkg(1)};
    checkSumPkg PACKAGE
        ATTRIBUTES
        checkSum GET;
    REGISTERED AS {softwaremanagement package(1) checkSumPkg
(1)};
    executeProgamPkg PACKAGE
        ACTIONS
        executeProgram;
    REGISTERED AS {softwaremanagement package(1) executeProgram
(1)};
    fileInformationPkg PACKAGE
        ATTRIBUTES
        dateOfCreation GET,
        identityofCreator GET,
        datefLastModification GET,
        identityOfLastModifier GET,
        dateDelivered GET,
        dateInstalled GET;
    REGISTERED AS {softwaremanagement package(1)
fileInformationPkg(1)};
    filepkg PACKAGE
        ATTRIBUTES
        filelocation GET,
        filesize GET,
        filetype GET;
    REGISTERED AS {softwaremanagement package(1) filePkg(1)};
    informationAutoBackupPkg PACKAGE
        ATTRIBUTES
        futureAutoBackupTriggerThreshold GET-REPLACE,
        futureAutoBackupDestination GET-REPLACE;
        NOTIFICATIONS
        autoBackupReport;
    REGISTERED AS (softwaremanagement package(1)
informationAutoBackupPkg(1)}
    informationAutoRestorePkg PACKAGE
        ATTRIBUTES
        futureAutoRestoreSource GET-REPLACE,
        futureAutoRestoreAllowed GET-REPLACE;
        NOTIFICATIONS
        autoRestoreReport;
    REGISTERED AS {softwaremanagement package(1)
informationAutoRestorePkg(1)};
    informationBackupPkg PACKAGE
        ATTRIBUTES
        lastBackupTime GET,
        lastBackupDestination GET;
        ACTIONS
        backup softwareProcessingFailureParameter;
    REGISTERED AS {softwaremanagement package(1)
informationBackupPkg(1)};
    informationRestorePkg PACKAGE
        ATTRIBUTES
        lastRestoreTime GET,
        lastRestoreSource GET;
        ACTIONS
        restore;
    REGISTERED AS {softwaremanagement package(1)
informationRestorePkg(1)};
    installpkg PACKAGE
        ACTIONS
        install;
    REGISTERED AS {softwaremanagement package(1) installPkg(1)};
```

APPENDIX A-continued

```
    installpkg PACKAGE
      ACTIONS
      install;
    REGISTERED AS {softwaremanagement package(1) installPkg(1)};
    noteFieldPkg PACKAGE
      ATTRIBUTES
      notefield GET-REPLACE;
    REGISTERED AS {softwaremanagement package(1)
noteFieldPkg(1)};
    processingErrorAlarmOnSersvicePkg PACKAGE
      NOTIFICATIONS
      processingErrorAlarm;
    REGISTERED AS {softwaremanagement package(1)
    processingErrorAlarmOnServicePkg(1)};
    revertpkg PACKAGE
      ACTIONS
      revert softwareProcessingFailureParameter;
    REGISTERED AS {softwaremanagement package(1) revertPkg(1)};
    terminateValidationPkg PACKAGE
      ACTIONS
      terminatevalidation;
    REGISTERED AS {softwaremanagement package(1)
terminateValidationPkg(1)};
    usageStatePkg PACKAGE
      ATTRIBUTES
      usageState GET;
    REGISTERED AS {softwaremanagement package(1)
usageStatePkg(1)};
    validationpkg PACKAGE
      ACTIONS
      validate;
    REGISTERED AS {softwaremanagement package(4) validatePkg(1)};
  The ATTRIBUTES construct lists any attributes that are included in the
package, along with a list for each attribute that define:
    operations available on the attribute (GET, REPLACE, ADD,
REMOVE);
  default, initial, permitted and required values for the attribute.
  For all the templates is used the REGISTERED AS construct to allocate
  a globally unique identifier that is carried in the parameters of CMIS
  primitives.
```

APPENDIX B

```
    managedElement MANAGED OBJECT CLASS
      DERIVED FROM "Recommendation X.721:1992":top;
      CHARACTERIZED BY
      managedElementPackage PACKAGE
      BEHAVIOUR
      managedElementBehaviour BEHAVIOUR
      DEFINED AS
  "The Managed Element object class is a class of managed objects representing
telecommunications equipment or TMN entities (either groups or parts) within the
telecommunications network that performs managed element functions, i.e., provides
support and/or service to the subscriber. Managed elements may or may not
additionally perform mediation/OS functions. A managed element communicates with
the manager (directly or indirectly) over one or more standard Q-interfaces for the
purpose of being monitored and/or controlled. A managed element contains equipment
that may or may not be geographically distributed.
  When the attribute value change notification package is present, the
attribute ValueChange notification defined in Recommendation X.721 shall be emitted
when the value of one of the following attributes changes: alarm status, user label,
version, location name and current problem list. For the above attributes that are in
conditional packages, the behaviour for emitting the attribute value change notification
applies only when the corresponding packages are present in the managed object.
When the state change notification package is present, the stateChangeNotification
defined in Recommendation X.721 shall be emitted if the value of administrative state
or operational state or usage state changes".
    ;;
    ATTRIBUTES
      managedElementId GET,
      "Recommendation X.721:1992":systemTitle GET-REPLACE,
      alarmStatus GET,
      "Recommendation X.721:1992":administrativeState GET-REPLACE,
      "Recommendation X.721:1992":operationalState GET,
      "Recommendation X.721:1992":usageState GET;
    NOTIFICATIONS
```

APPENDIX B-continued

```
    "Recommendation X.721:1992":enviromnentalAlarm,
    "Recommendation X.721:1992":equipmentAlarm,
    "Recommendation X.721:1992":communicationAlarm,
    "Recommendation X.721:1992":processingErrorAlarm;;;
CONDITIONAL PACKAGES
  createDeleteNotificationsPackage PRESENT IF "the objectCreation and
objectDeletion
    notifications defined in Recommendation X.721 is supported by
an instance of this class.",
  attributeValueChangeNotificationPackage PRESENT IF "the
attributeValueChange
    notification defined in Recommendation X.721 is supported by
an instance ofthis class.",
  stateChangeNotificationPackage PRESENT IF "the
stateChangenotification defined in
    Recommendation X.721 is supported by an instance of this
class.",
  audibleVisualLocalAlarmPackage PRESENT IF "an instance supports
it",
    resetAudibleAlarmPackage PRESENT IF "an instance supports it",
    userLabelPackage PRESENT IF "an instance supports it",
    vendorNamePackage PRESENT IF "an instance supports it",
    versionPackage PRESENT IF "an instance supports it",
    locationNamePackage PRESENT IF "an instance supports it",
    currentProblemListPackage PRESENT IF "an instance supports it",
    externalTimePackage PRESENT IF "an instance supports it",
    systemTimingSourcePackage PRESENT IF "an instance supports it";
REGISTERED AS {m3100ObjectClass3};
```

What is claimed is:

1. A Software Fault Management (SFM) system for managing software faults in a managed mobile telecommunications network, said SFM system comprising:

an Intelligent Management Information Base (I-MIB) comprising a Management Information Base (MIB) and a Knowledge Base (KB), said KB including a functional model of said managed network; and an intelligent multi-agent portion having a plurality of agents which process said software faults utilizing information from said I-MTB, said plurality of agents in said multi-agent portion including:

a plurality of middle-level agents, each of said middle-level agents comprising a plurality of lower-level sub-agents for performing reasoning, testing, and knowledge-maintenance activities; and a top-level coordinator super-agent which controls said middle-level agents.

2. The SFM system for managing software faults of claim 1 wherein said plurality of middle-level agents perform fault correlation and fault diagnosis.

3. The SFM system for managing software faults of claim 2 further comprising a trouble shooting assistant agent which devises a plan of trouble shooting steps, executes the plan, and assists engineers in debugging and correction tasks.

4. A Software Fault Management (SFM) system for managing software faults in a managed mobile telecommunications network, said SFM system comprising:

an Intelligent Management Information Base (I-MIB) comprising a Management Information Base (MIB) and a Knowledge Base (KB), said KB including a functional model of said managed network and a trouble report/known faults (TR/KF) case base; and an intelligent multi-agent portion having a plurality of agents which process said software faults utilizing information from said I-MIB.

5. The SFM system for managing software faults of claim 4 wherein said intelligent multi-agent portion utilizes model-based reasoning in combination with an experiential knowledge technique to process said software faults.

6. The SFM system for managing software faults of claim 5 wherein said experiential knowledge technique is case-based reasoning.

7. The SFM system for managing software faults of claim 5 wherein said experiential knowledge technique is machine learning.

8. A method of managing software faults in a managed mobile telecommunications network, said method comprising the steps of:

storing a Knowledge Base (KB) in an Intelligent Management Information Base (I-MIB) said KB including a functional model of said managed network;

storing a Management Information Base (MIB) in said I-MIB; and processing said software faults with a plurality of agents in an intelligent multi-agent system utilizing information from said I-MIB, said processing step including the steps of:

performing reasoning, testing, and knowledge-maintenance activities utilizing a plurality of lower-level sub-agents;

performing correlation and diagnosis activities with a plurality of middle-level agents; and controlling said middle-level agents with a top-level coordinator super-agent.

9. A method of managing software faults in a managed mobile telecommunications network, said method comprising the steps of:

storing a Knowledge Base (KB) in an Intelligent Management Information Base (I-MID), said KB including a functional model of said managed network;

storing a Management Information Base (MIB) in said I-MITB; and processing said software faults with a plurality of agents in an intelligent multi-agent system utilizing information from said I-MIB, said processing step utilizing a trouble shooting assistant agent to perform the steps of:

devising a plan of trouble shooting steps;
executing the plan; and
assisting engineers in debugging and correction tasks.

10. A method of managing software faults in a managed mobile telecommunications network, said method comprising the steps of:
storing a Knowledge Base (KB) in an Intelligent Management Information Base (I-MIB), said KB including a functional model of said managed network;
storing a Management Information Base (MIB) in said I-MIB; and
processing said software faults with a plurality of agents in an intelligent multi-agent system utilizing information from said I-MIB, said processing step utilizing model-based reasoning to process said software faults.

11. A method of managing software faults in a managed mobile telecommunications network, said method comprising the steps of:
storing a Knowledge Base (KB) in an Intelligent Management Information Base (I-MIB), said KB including a functional model of said managed network and a trouble report/known faults (TR/KF) case base;
storing a Management Information Base (MIB) in said I-MIB; and
processing said software faults with a plurality of agents in an intelligent multi-agent system utilizing information from said I-MIB said processing step utilizing case-based reasoning to process said software faults.

12. A Software Fault Management (SFM) system for managing software faults in a managed mobile telecommunications network, said SFM system comprising:
an Intelligent Management Information Base (I-MIB) comprising a Management Information Base (MIB) and a Knowledge Base (KB), said KB including a functional model of said managed network;
an intelligent multi-agent portion having a plurality of agents which process said software faults utilizing model-based reasoning and information from said I-MIB, said plurality of agents comprising:
a plurality of middle-level agents for performing fault correlation and fault diagnosis, each of said middle-level agents comprising a plurality of lower-level sub-agents for performing reasoning, testing, and knowledge-maintenance activities; and
a top-level coordinator super-agent which controls said middle-level agents;
a trouble shooting assistant agent which devises a plan of trouble shooting steps, executes the plan, and assists engineers in debugging and correction tasks; and
a human-computer interface which provides human operators the ability to interface with the SFM system for network operation, administration, maintenance, and provisioning (OAM&P).

13. The SFM system for managing software faults of claim 12 wherein said KB also includes a trouble report/known faults (TR/KF) case base.

14. The SFM system for managing software faults of claim 13 wherein said intelligent multi-agent portion also utilizes case-based reasoning to process said software faults.

15. The SFM system for managing software faults of claim 12 wherein said intelligent multi-agent portion includes means for proactively managing said network by predicting potential faults and preventing said potential faults from occurring.

16. The SFM system for managing software faults of claim 15 wherein said intelligent multi-agent portion includes means for reactively managing said network by performing corrective processing of reported software faults.

17. The SFM system for managing software faults of claim 12 wherein said I-MIB and said intelligent multi-agent portion are compliant with Telecommunication Management Network (TMN) principles and framework.

18. A method of proactively managing software faults in a mobile telecommunications network, said method comprising the steps of:
storing knowledge in a knowledge base, said knowledge including a functional model of said network, fault models, and fault scenarios;
monitoring said network for observed events and symptoms;
determining a suspected fault to explain said observed events and symptoms, said determining step comprising:
comparing said observed events and symptoms with stored performance data and statistics; and
analyzing said comparison with said stored knowledge;
determining whether the suspected fault is a known fault;
implementing a preventive solution upon determining that the suspected fault is a known fault;
performing a fault trend analysis upon determining that the suspected fault is not a known fault;
performing diagnostic tests;
determining whether a successful diagnosis was obtained;
performing a fault localization process upon determining that a successful diagnosis was obtained, said fault localization process including analyzing relationships between components involved in the diagnosis of said fault; and
providing diagnosis and localization information to trouble shooters.

19. A Software Fault Management (SFM) system for managing software faults in a telecommunications network having a plurality of network resources, said SFM system comprising:
a Knowledge Base (KB), said KB including:
a database of behavioral information regarding how the network resources respond in given fault scenarios; and
a functional model of the telecommunications network; and
a plurality of intelligent agents which process the software faults utilizing information from the KB, said agents comprising:
a plurality of middle-level agents, each of said middle-level agents comprising a plurality of lower-level sub-agents for performing reasoning, testing, and knowledge-maintenance activities; and
a top-level coordinator super-agent which controls said middle-level agents.

20. The SFM system for managing software faults of claim 19 wherein said intelligent agents utilize model-based reasoning to process said software faults.

21. The SFM system for managing software faults of claim 19 wherein said intelligent agents utilize model-based reasoning in combination with an experiential knowledge technique to process said software faults.

22. The SFM system for managing software faults of claim 19 wherein said KB also includes a trouble report/ known faults (TR/KF) case base, and the experiential knowledge technique is case-based reasoning.

23. A method of managing software faults in a telecommunications network having a plurality of network resources, said method comprising the steps of:
   storing a database of behavioral information regarding how the network resources respond in given fault scenarios in a Knowledge Base (KB);
   storing a functional model of the telecommunications network in the KB; and
   processing the software faults with a plurality of intelligent agents utilizing information from the KB, said processing step including the steps of:
      performing reasoning, testing, and knowledge-maintenance activities utilizing a plurality of lower-level sub-agents;
      performing correlation and diagnosis activities with a plurality of middle-level agents; and
      controlling the middle-level agents with a top-level coordinator super-agent.

24. The method of managing software faults in a telecommunications network of claim 23 wherein the step of processing the software faults includes utilizing model-based reasoning to process the software faults.

25. A method of managing software faults in a telecommunications network having a plurality of network resources, said method comprising the steps of:
   storing a database of behavioral information regarding how the network resources respond in given fault scenarios in a Knowledge Base (KB);
   storing a functional model of the telecommunications network in the KB;
   storing a trouble report/known faults (TR/KF) case base in the KB; and
   processing the software faults with at least one intelligent agent utilizing information from the KB and case-based reasoning.

26. The SFM system for managing software faults of claim 19 further comprising:
   a trouble shooting assistant agent which devises a plan of trouble shooting steps, executes the plan, and assists engineers in debugging and correction tasks; and
   a human-computer interface which provides human operators the ability to interface with the SFM system for network operation, administration, maintenance, and provisioning (OAM&P).

* * * * *

UNITED STATES PATENT AND TRADEMARK OFFICE
CERTIFICATE OF CORRECTION

PATENT NO. : 6,012,152
DATED : January 4, 2000
INVENTOR(S) : Samir Douik, et al.

It is certified that error appears in the above-identified patent and that said Letters Patent is hereby corrected as shown below:

Column 19, Line 20, delete "Tus" and substitute - - - Thus - - -

Signed and Sealed this

Twenty-sixth Day of December, 2000

Attest:

Q. TODD DICKINSON

Attesting Officer

Director of Patents and Trademarks